Dec. 20, 1966  K. A. RIEDEL  3,292,235
MACHINE TOOL WITH A COMBINED TOOL STORAGE AND
CHANGING MECHANISM
Filed Aug. 20, 1963  9 Sheets-Sheet 1

INVENTOR.
Kurt A. Riedel
BY
Cyril M. Hajewski
Attorney

INVENTOR.
Kurt A. Riedel
BY Cyril M. Hajewski
Attorney

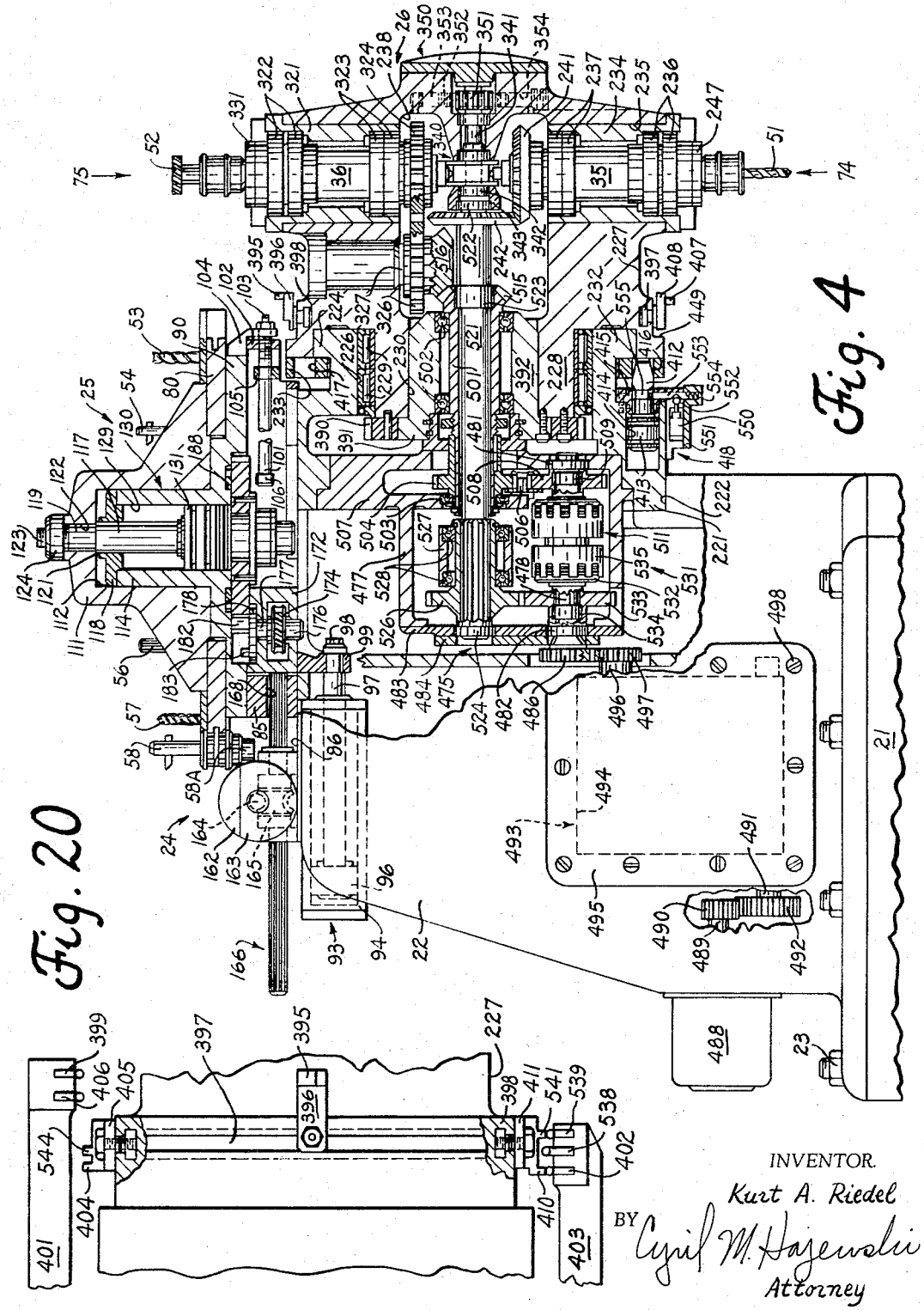

Dec. 20, 1966  K. A. RIEDEL  3,292,235
MACHINE TOOL WITH A COMBINED TOOL STORAGE AND
CHANGING MECHANISM
Filed Aug. 20, 1963  9 Sheets-Sheet 4
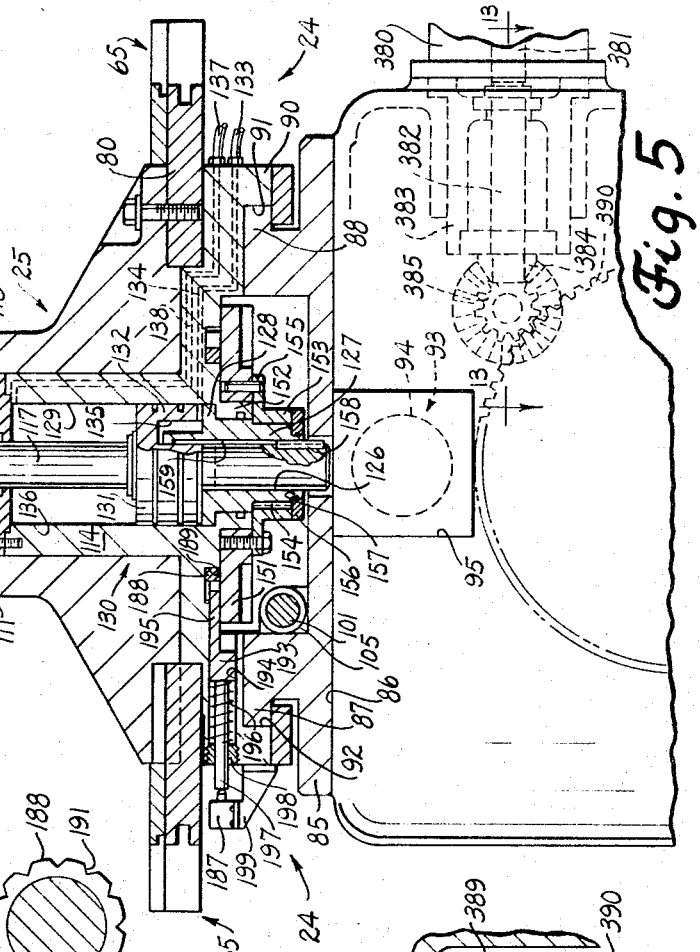
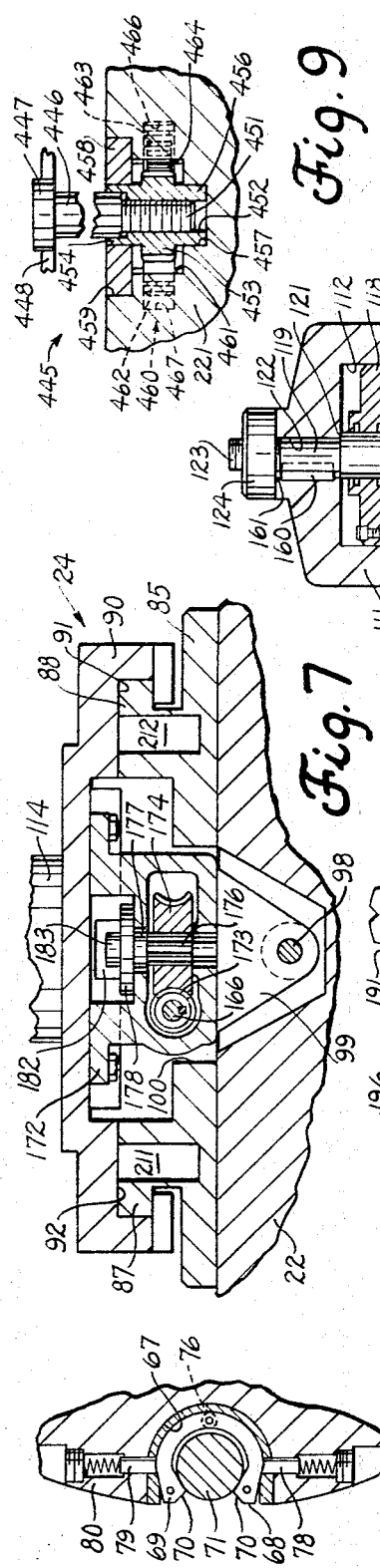
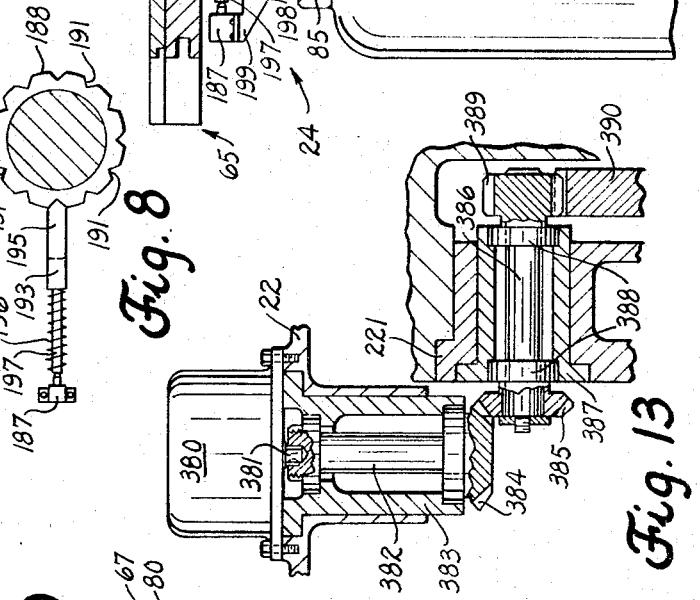
INVENTOR.
Kurt A. Riedel
BY Cyril M. Hajewski
Attorney

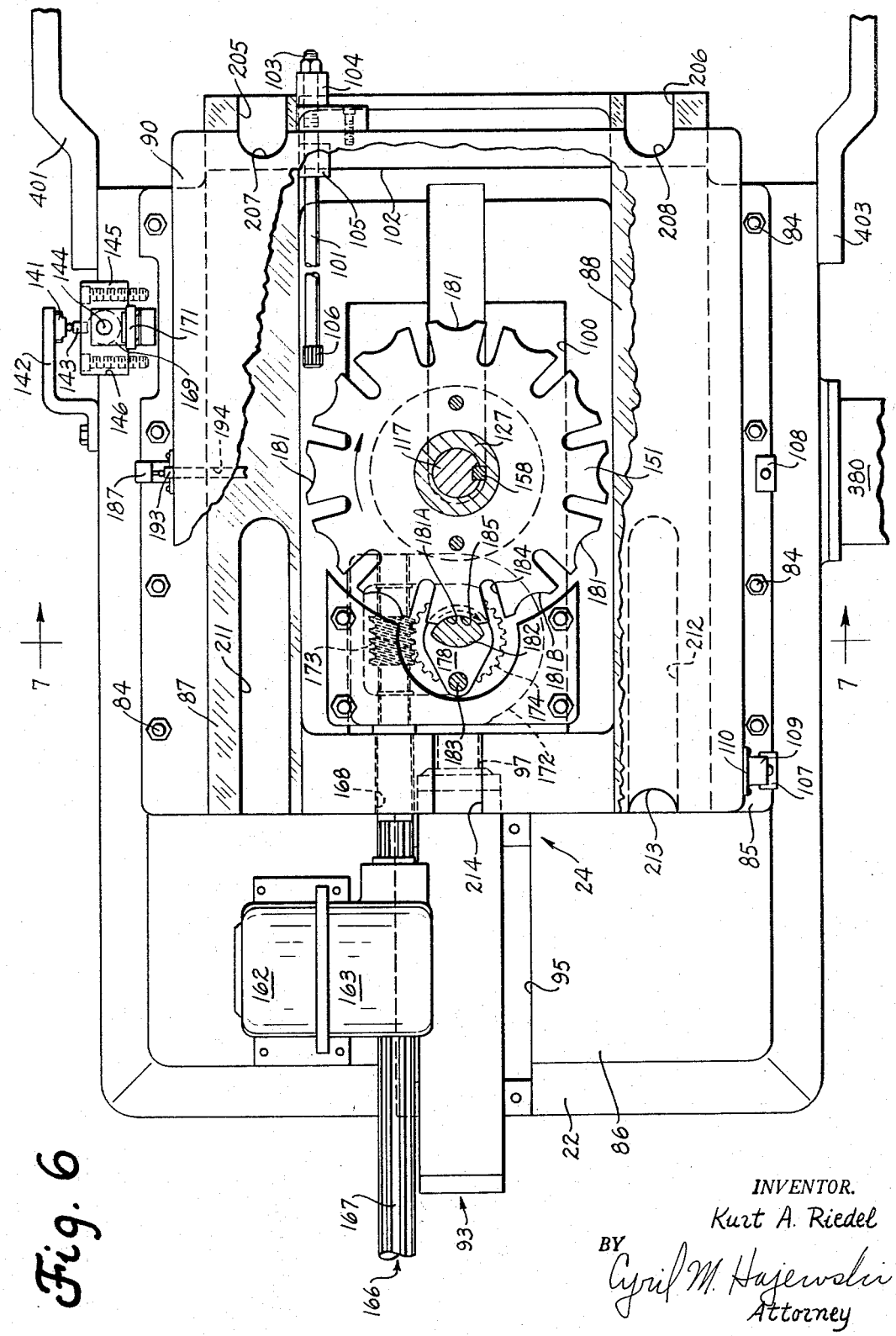

INVENTOR.
Kurt A. Riedel

Dec. 20, 1966  K. A. RIEDEL  3,292,235
MACHINE TOOL WITH A COMBINED TOOL STORAGE AND
CHANGING MECHANISM
Filed Aug. 20, 1963  9 Sheets-Sheet 7
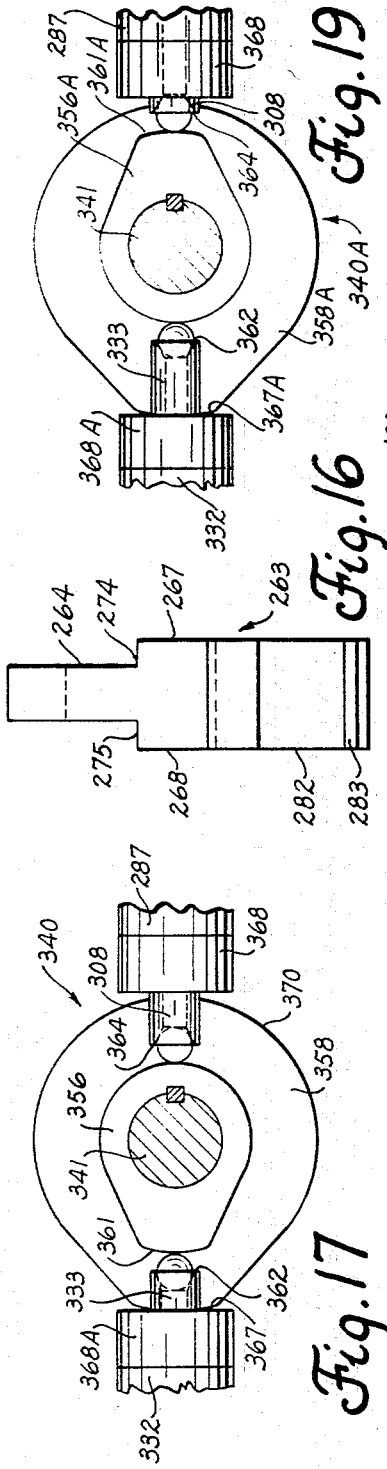
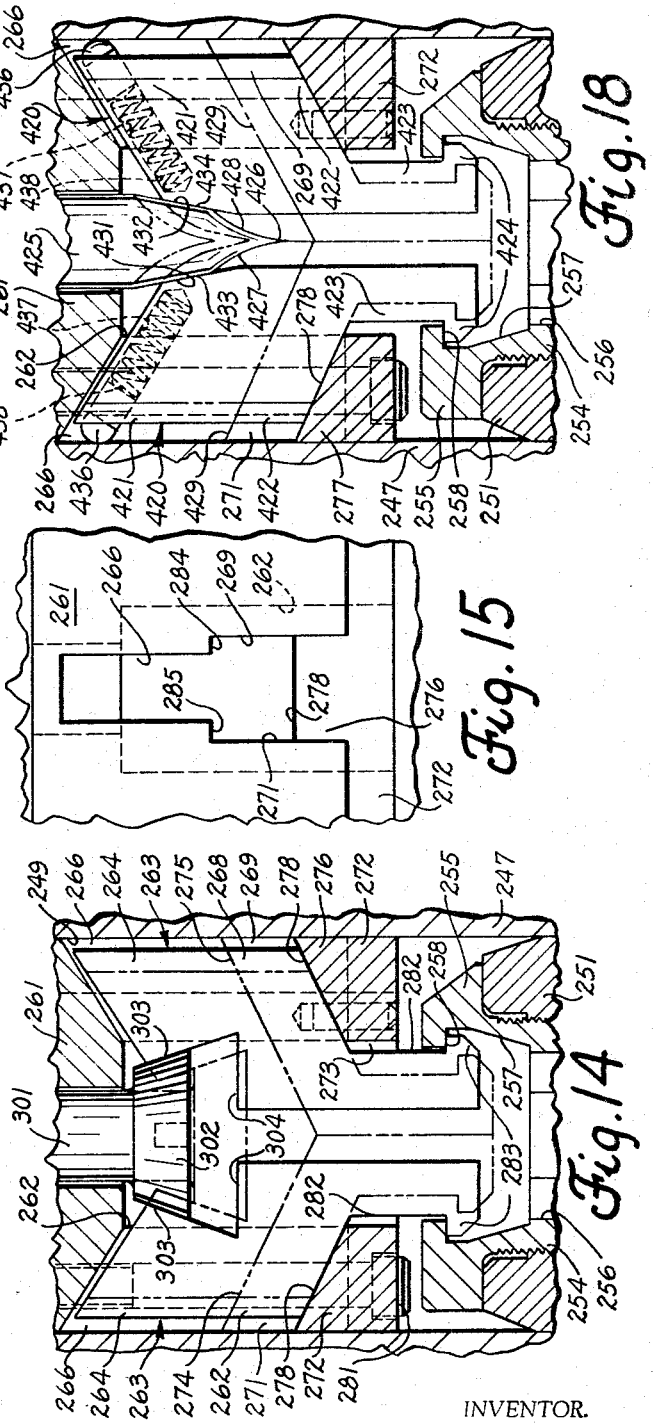
INVENTOR.
Kurt A. Riedel
BY Cyril M. Hajewski
Attorney

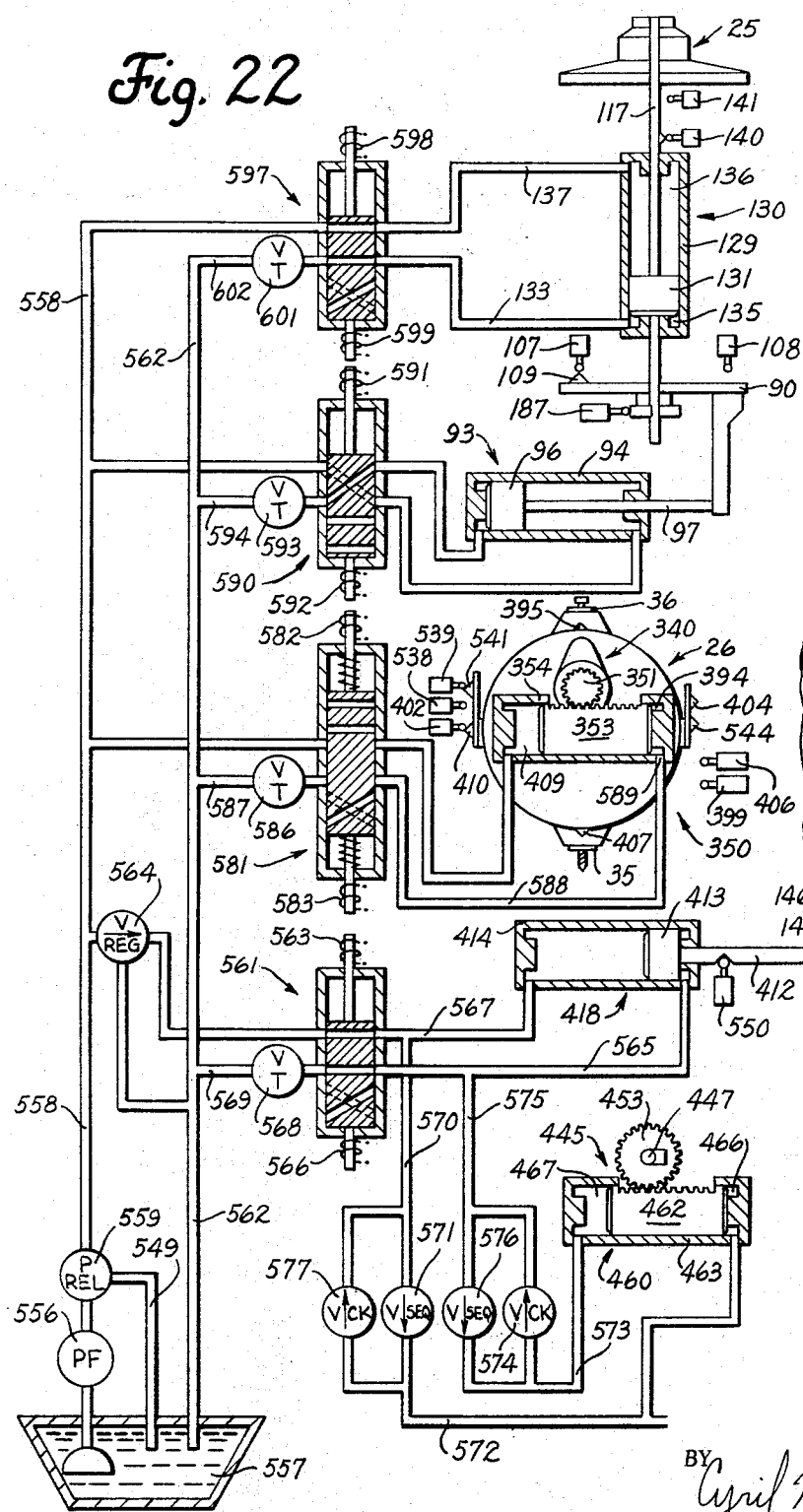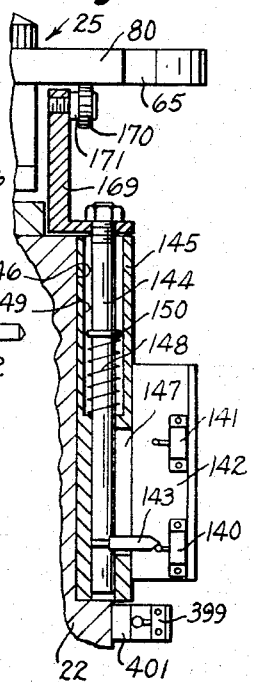

United States Patent Office 3,292,235
Patented Dec. 20, 1966

3,292,235
MACHINE TOOL WITH A COMBINED TOOL STORAGE AND CHANGING MECHANISM
Kurt A. Riedel, Milwaukee, Wis., assignor to Kearney & Trecker Corporation, West Allis, Wis., a corporation of Wisconsin
Filed Aug. 20, 1963, Ser. No. 303,280
8 Claims. (Cl. 29—26)

This invention relates generally to machine tools and more particularly to an improved machine tool provided with a plurality of rotary cutting tools of different types that may be made individually operative automatically for performing a variety of machining operations on a single workpiece or on a number of workpieces in rapid succession.

It is a general object of the present invention to provide a machine tool with improved versatility.

Another object of the present invention is to provide an improved machine tool having a plurality of rotary cutting tools that may be made individually operative for performing a variety of machining operations.

Another object of the present invention is to provide an improved machine tool with dual rotary spindles and having automatically operated mechanical means operable to replace the cutting tools in the spindles.

Another object of the present invention is to provide an improved machine tool with storage facilities for a plurality of rotary cutting tools that may be individually coupled with one or the other of two rotary spindles with the desired tool being automatically selected and coupled to a spindle while the other spindle is utilized in a work performing operation.

A further object of the present invention is to provide a dual spindle machine tool with a tool storage magazine for a plurality of cutting tools wherein the storage magazine is operable to remove a tool from one of the spindles and insert a different tool into the spindle while the other spindle is performing a work operation.

A still further object of the present invention is to provide a machine tool with a tool storage magazine that is supported for axial, rotary and lateral movements for replacing the tools in the spindles with tools from the storage magazine which is located remote from the operating station.

A still further object of the present invention is to provide an improved means for automatically locking and releasing a tool in a machine spindle.

Another object of the present invention is to provide a simple and effective mechanism for locking tools in driving engagement in a rotatable spindle of a machine tool.

Another object of the present invention is to provide a novel machine tool construction that is readily convertible from a vertical spindle machine to a horizontal spindle machine by rearranging the components.

Another object of the present invention is to provide an improved machine tool having a tool changer in which the major assemblies may be mounted as separate units in their operating positions on a single support to facilitate assembly and servicing of the machine tool.

According to this invention, the improved machine tool is provided with a spindle head having a pair of diametrically opposed vertical rotary spindles and a plurality of cutting tools adapted to be received by the spindles for rotation therewith to perform machining operations. The spindle head is rotatable for moving its two spindles between an operating station and a tool change station. The cutting tools are stored in a magazine so that they may be moved in a circular path to locate a selected tool for insertion into the spindle that is located at the tool change station.

When the spindle at the operating station has completed a machining operation, the spindle head is indexed to move the spindle from the work station into the tool change station. Simultaneously, the spindle with a tool that is located in the tool change station is moved to the work station, so that it may be operated to perform a machining operation while the previously used tool is being changed. With the previously operated spindle in the tool change station, the magazine is moved laterally so that an empty socket of the magazine engages the tool in the spindle that was moved into the tool change station. The magazine is then caused to move axially upwardly for withdrawing the engaged previously used tool from the spindle and, while in the elevated position, is indexed to bring a selected tool into position of alignment with the spindle in the tool change station. Thereupon, the magazine is moved downwardly to insert the selected new tool into the idle spindle. After the magazine has operated to insert the new tool in the idle spindle, the magazine is moved laterally into a ready position with the now empty socket positioned ready to receive the tool presently being used by the other spindle to perform a machining operation.

After the spindle in the operating station has completed its particular operation, the spindle head is indexed to bring the spindle in the tool change station, with its new tool, into the operating station, while the spindle previously located in the operating station is moved to the tool change station, where it will receive a new tool while the other spindle is working.

The improved machine tool includes the novel arrangement of the supporting pedestal that movably carries the knee, saddle and table, constructed as a basic unit adapted to receive and support the dual spindle indexing head and the tool changer storage apparatus and their associated drives, either as a vertical spindle arrangement, or a horizontal spindle arrangement.

The foregoing and other objects of this invention, which will become more fully aparent from the following detail description, may be achieved by means of the exemplifying apparatus depicted in and set forth in this specification in connection with the accompanying drawings, in which:

FIG. 4 is an enlarged view of the column and the structure supported by it shown partly in elevation and partly in vertical section through the tool changing unit and the spindle head unit, showing the various drive components;

FIG. 5 is an enlarged view in rear elevation of the upper portion of the column and showing a view in transverse vertical section of the tool changing unit supported thereon;

FIG. 6 is an enlarged plan view of the machine column with parts omitted to illustrate the magazine indexing drive;

FIG. 7 is a fragmentary detailed view in transverse vertical section through the tool change base and slide taken along the plane represented by the line 7—7 in FIG. 6, showing the Geneva index drive arrangement for indexing the tool storage magazine;

FIG. 8 is an enlarged plan view of the magazine index motor stop ring and plunger mechanism shown in FIG. 5;

FIG. 9 is an enlarged view partly in section and partly in elevation of one of the spindle head clamps;

FIG. 10 is a detailed fragmentary view in horizontal section through one of the tool sockets of the tool storage magazine;

FIG. 11 is a fragmentary elevational view showing a tool supported by one of the sockets in the tool storage magazine;

FIG. 13 is a fragmentary view partly in plan and partly in horizontal section taken along the plane represented by the line 13—13 in FIG. 5, showing the index drive arrangement for the spindle head;

FIG. 14 is a fragmentary view in longitudinal section through a spindle showing the apparatus for effecting axial locking of a tool in a spindle;

FIG. 15 is a fragmentary detail view in side elevation of the gripping member supporting block depicted in FIG. 14, showing the guideway construction therein;

FIG. 16 is an enlarged detail view in elevation showing the construction of a gripping member illustrated in FIG. 14;

FIG. 17 is an enlarged plan view illustrating the actuating cam member shown in FIG. 12, for effecting the simultaneous operation of the gripping members associated with each spindle;

FIG. 18 is an enlarged view similar to FIG. 14 showing a modified arrangement of the drawbar and gripping members;

FIG. 19 is an enlarged plan view illustrating the actuating cam member arranged for operation with the gripping members shown in FIG. 18;

FIG. 20 is an enlarged fragmentary plan view of the collar portion of the spindle head showing the arrangement of various dogs and limit switches that are utilized in regulating the sequential operation of the various machine components;

FIG. 21 is an enlarged fragmentary view of the upper left-hand portion of the column shown in FIG. 1 with parts broken away to show the arrangement for actuating limit switches utilized to control the sequential operation of the illustrated machine tool;

FIG. 22 is a diagrammatic view of the hydraulic circuit;

Figure 1:
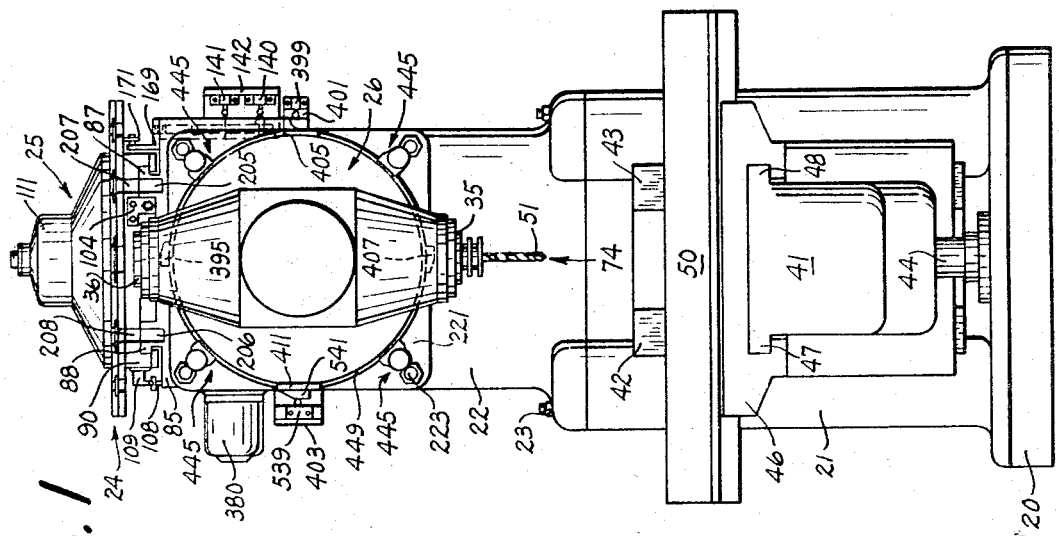
FIGURE 1 is a general view in front elevation of a vertical spindle type machine tool embodying the present invention, with the cutting tools being omitted from the tool storage magazine and the spindle in the tool change station.
Figure 24:
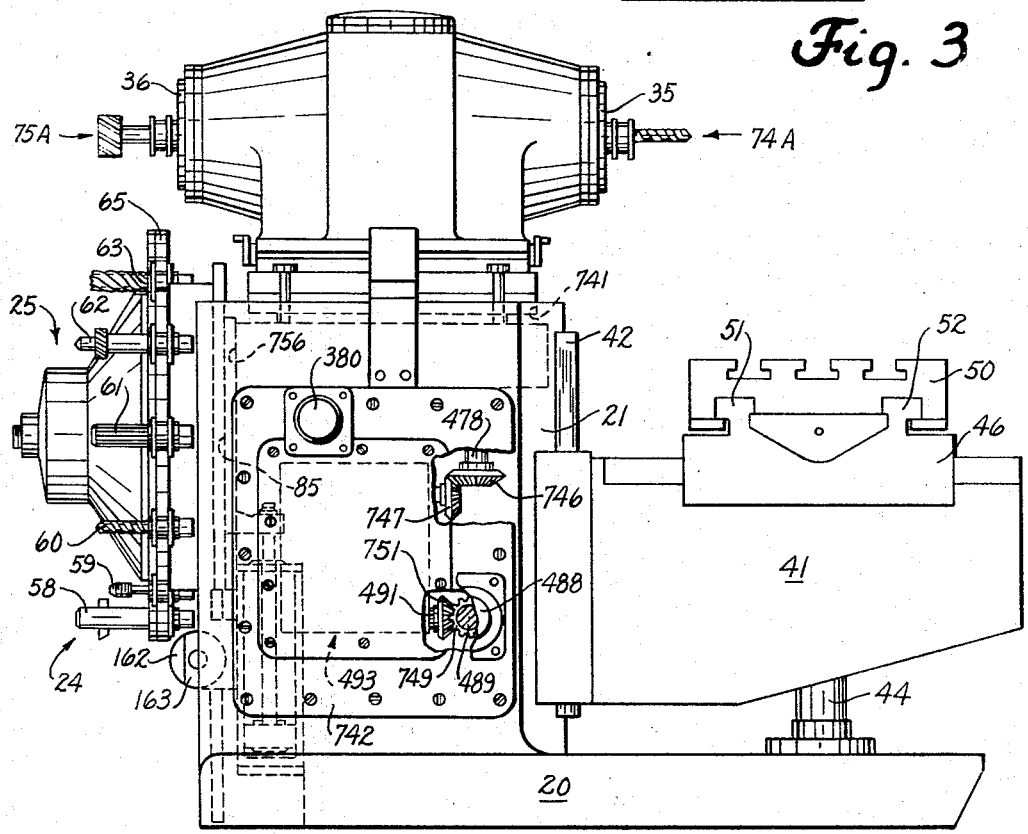
Figure 23:
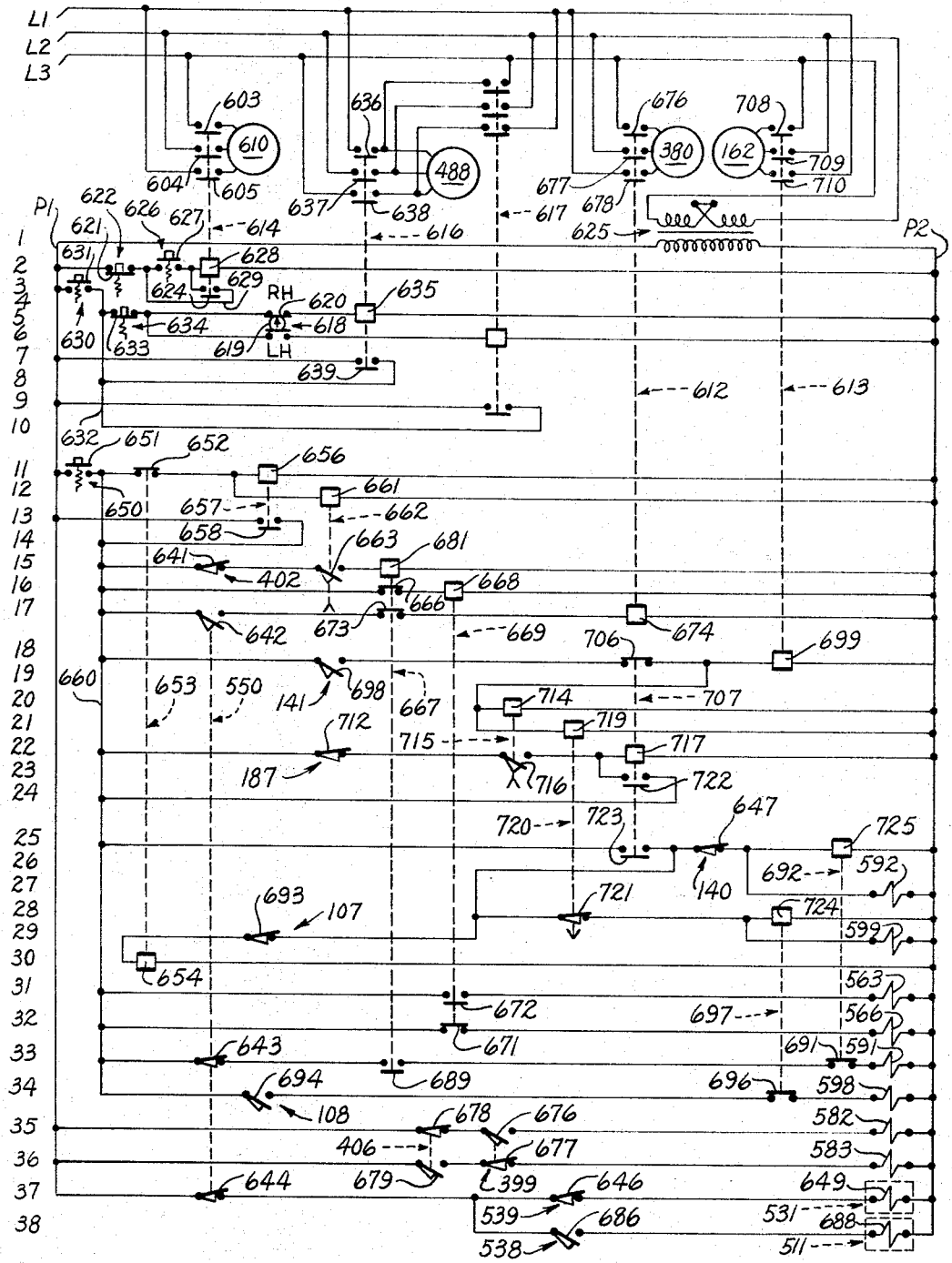

FIG. 23 is a diagrammatic view of an electrical wiring diagram illustrating the control circuit for controlling the operation of the various components in completing a tool change; and, FIG. 24 is a view in side elevation of a machine arrangement in which the various components assembled to produce the machine tool depicted in FIG. 1 have been rearranged on the pedestal for converting the machine to a horizontal spindle type machine tool.

Reference is now made to the drawings and particularly to FIGS. 1, 2, 3 and 4 thereof, illustrating a machine tool incorporating the features of the present invention. The machine comprises a base 20 having a vertical upstanding hollow pedestal 21 that carries on its upper machined surface a hollow column 22 that is removably secured thereon by bolts 23. The column 22 is adapted to carry a tool changing unit 24 having a tool storage magazine 25 that is axially, rotatably and laterally movable. On its upper vertical front face, the column 22 carries an indexable dual spindle head 26 that is provided with a pair of diametrically opposed rotatable tool spindles 35 and 36, the spindle 35 being shown in detail in FIG. 12.

On the front face of the pedestal 21, a knee 41 is slidably supported for vertical movement on ways 42 and 43 and is adjustable by means of the usual screw and nut mechanism [not shown] enclosed in a telescoping housing 44. A saddle 46 is slidably supported on ways 47 and 48 for transverse horizontal movement relative to the knee 41 and the pedestal 21, and a worktable 50 is slidably supported on ways 51 and 52 for longitudinal movement.

Figure 2:
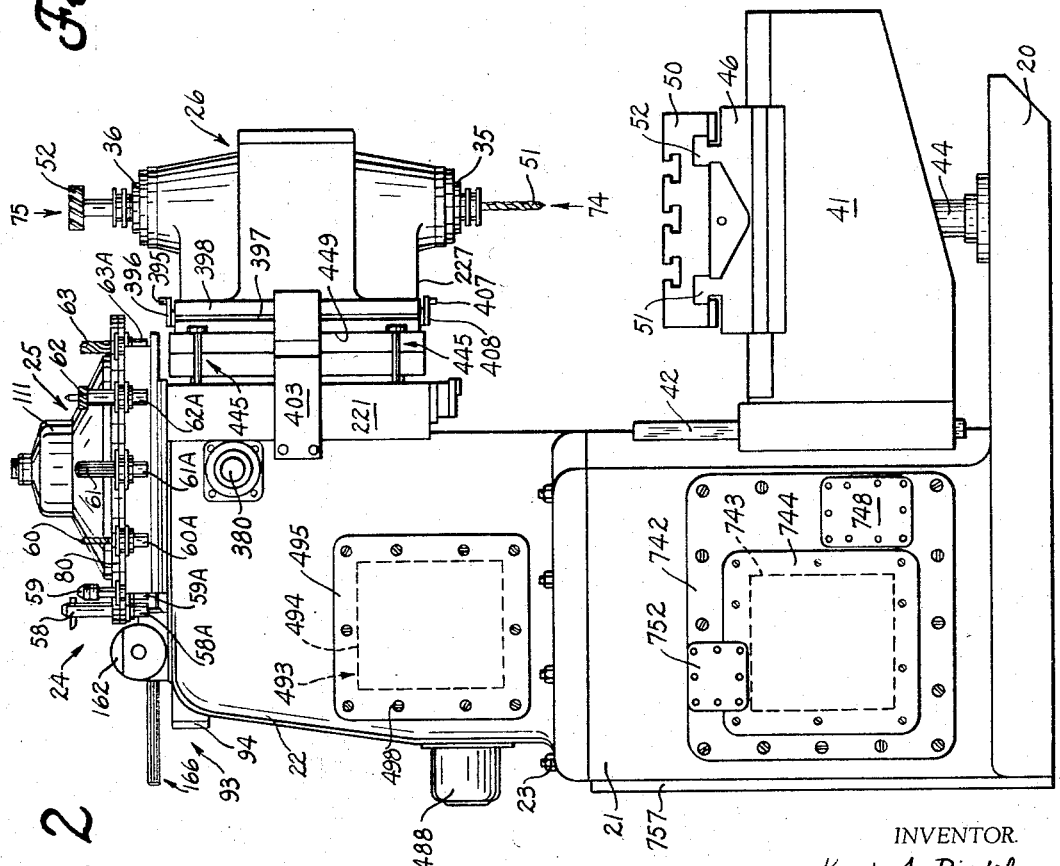
FIG. 2 is a view in left side elevation of the machine tool shown in FIG. 1, with the cutting tools being added to the tool storage magazine and the spindle in the tool change station.
Figure 3:
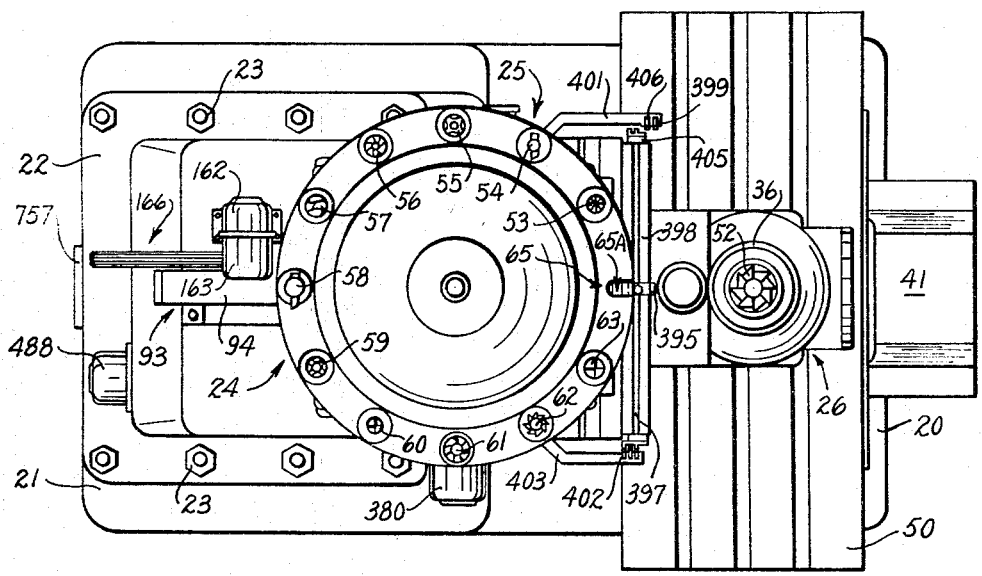
FIG. 3 is a plan view of the machine tool shown in FIG. 2.

The tool storage magazine 25 carried on the top of the column 22 is adapted to hold a plurality of peripherally spaced cutting tools such, for example, as cutting tools 53 to 63, inclusive, shown in FIGS. 2 and 3. Each of the tools 53 to 63, inclusive, is secured within an associated tool holder 53a to 63a, inclusive, the latter being releasably carried by the magazine 25 for insertion into one or the other of the spindles 35 or 36. As represented in FIGS. 2 and 4, a tool 51 is operatively carried by the spindle 35 while the spindle 36 carries a tool 52. The spindle head 26 is indexable into either one of two positions to interchange the locations of the spindles 35 and 36. In FIGS. 1 and 2, the spindle 35 is shown positioned in an operating station 74, while the spindle 36 is depicted as being located in a tool change station 75. The spindle head 26 may be indexed 180° to interchange the positions of these two spindles. To simplify the description, the term tool is deemed to identify both a cutting tool and an associated toolholder.

The particular magazine 25 illustrated herein is provided with twelve U-shaped sockets or grips 65 which are equally spaced about the periphery of the magazine 25 for receiving the several cutting tools. The latter are carried in inverted position with the shank of the toolholder depending from the magazine for insertion into the upwardly facing tool receiving socket of the particular spindle that is located at the tool change station 75.

Since each socket 65 is identical, it is deemed sufficient to describe only one. In FIGS. 10 and 11, a socket 65 is shown in detail and is provided with a recess 67 which receives a pair of semicircular fingers 68 and 69, each of which is provided with an inwardly facing projection 70 adapted to cooperatively engage the peripheral surface of the tool. Both fingers 68 and 69 are pivotable about a pin 76 which serves both as a pivot and as the means for holding the fingers in operative position in the socket. Each finger is biased inwardly by means of resiliently urged plungers 78 and 79 horizontally disposed in suitable adjacent openings formed in a circular tool carrying support 80.

The fingers 68 and 69 embrace the periphery of a tool in the socket 65, and the pressure exerted upon them by the plungers 78 and 79 cause the fingers to yieldably retain the tool in the socket 65 for storage. The tool is passed laterally into and out of the socket 65 and its periphery bears against the projections 70 during such passage for pivoting the fingers away from each other against the pressure of the plungers 78 and 79 for admitting the tool into and out of the socket.

An interchange of tools between the spindle 35 or 36 at the tool change station 75 and the tool storage magazine 25 is completed by the operation of the magazine. To this end, the magazine 25 is first moved laterally toward the spindle located in the tool change station and facing upwardly. This lateral movement will effect a positive gripping engagement of an empty socket 65 with the tool, such as the tool 52 carried by the spindle 36 after lateral movement has been completed and with the tool firmly engaged in the socket, the magazine 25 will be caused to move axially upwardly to withdraw the tool out of the spindle. When the tool has been completely withdrawn from the spindle, the magazine is indexed in a clockwise direction, as viewed in FIG. 3. The clockwise indexing movement of the magazine 25 will bring the next adjacent socket, carrying the tool 53, into axial alignment with the now empty spindle 36 in position for insertion therein. Upon completion of the indexing movement, the magazine will be moved downwardly to insert the new tool 53 into operative position in the spindle. After the tool insertion has been accomplished, the magazine 25 is moved laterally away from the spindle 36 to a non-interfering parked or ready position. In the ready position, the magazine structure is positioned rearwardly of the spindle head 26 sufficiently far so as not to interfere with a subsequent indexing movement of the spindle head.

The tool change unit 24, which includes the magazine 25, is operatively carried on the top of the column 22, as previously mentioned and is arranged and constructed as a unit assembly. As shown in FIGS. 4, 5, 6 and 7, the tool changing unit 24 comprises a base 85 which is detachably secured by bolts 84 on a suitable machine surface 86 formed on the upper horizontal face of the column 22. The base 85 is provided with spaced apart parallel ways 87 and 88 which extend forwardly to the front face of the column. A slide 90 provided with guideways 91 and 92 complementary to the ways 87 and 88 is supported thereon for reciprocating movement therealong from the ready or parked position which it occupies, as shown in FIGS. 2 and 4, into the tool change station 75. Such reciprocation of the slide 90 is effected by means of a piston and cylinder fluid actuator 93 comprising a cylinder 94 that is horizontally disposed in a channel or recess 95 formed in the top surface of the column 22 and secured therein so that it is stationary relative to the column. A piston 96, reciprocal within the cylinder, is provided with a piston rod 97 which extends outwardly and forwardly of the cylinder. The forward extending end 98 of the rod is connected to a depending slide bracket 99, as shown in FIGS. 4 and 7, which extends downwardly through a rectangular opening 100 formed in the bottom of the base 85. Thus, as the piston 96 is caused to move rightwardly within the cylinder 94, the slide 90 and associated storage magazine 25 will also move rightwardly relative to the supporting base 85 and column 22 into the tool change station 75.

In accomplishing a tool change, the magazine 25 is moved forward into the tool change station 75, as previously mentioned, so that the empty forward socket 65 engages the tool presented by the upwardly facing spindle located in the tool change station. After such engagement has been effected, the magazine 25 is moved axially upward to withdraw the tool from the spindle. Thereafter, the magazine 25 is indexed to move the withdrawn tool out of axial alignment with the spindle and to move the next adjacent tool into axial alignment with the spindle. With the new tool in axial alignment with the spindle, the magazine 25 is moved axially downwardly for inserting the axially aligned new tool into the spindle. With the tool inserted into operative association with the spindle, the magazine 25 is moved out of the tool change station and into the ready station, with the empty socket positioned ready for the next tool change cycle. It is apparent, therefore, that accurate positioning of the magazine 25 in its forward location at the tool change station 75 is important. To insure precise forward location of the magazine 25, a positive stop is provided to adjustably establish the forward limit to which the slide 90 may be advanced. As shown in FIGS. 4 and 6, the positive stop arrangement comprises a rod 101 horizontally disposed within the interior of the base 85 and having its forward end slidably extending through the upstanding forward end wall 102 of the tool changer base 85. The outer threaded end 103 of the rod 101 is threadedly connected in a depending leg of a bracket 104 that is secured to the front face of the slide 90. Within the interior of the base 85, the rod 101 freely passes through a stop block 105 that extends laterally from the inner side surface of the way 87. An enlarged head 106 formed on the inner end of the rod 101 is provided to engage the stop block 105 to limit the extent of forward advancement of the slide 90. Thus, by adjusting the rod axially, either leftwardly or rightwardly, as viewed in FIGS. 4 and 6, the distances between the rod head 106 and the inner face of the stop block 105 may be varied so as to establish the limit of forward movement for the slide 90.

Completion of each movement of the tool change mechanism 24 and its associated magazine 25 must be indicated in the electrical control system to condition it for succeeding steps in the tool changing cycle. The position of the tool change mechanism 24 is indicated in the control system by a pair of limit switches 107 and 108 that are mounted in spaced apart relationship on the flange of the base 85, as shown in FIG. 6. The limit switches 107 and 108 are actuated by a depending dog 109 carried by a bracket 110 that is secured to the left side surface of the slide 90. The dog 109 is positioned to engage the plunger of the limit switch 107 to actuate the switch and thereby indicate that the tool change mechanism is in retracted ready position. On the other hand, when the actuator 93 is operated to advance the slide 90 into the tool change station 75 coupling the magazine with a tool presented by a spindle, the dog 109 will engage the plunger of the limit switch 108 to actuate the latter and indicate in the electrical control system that the tool change mechanism is fully advanced.

As previously mentioned, the tool change unit includes the tool storage magazine 25 which is carried by the slide 85 for movement with the slide and also for independent axial and rotational movement relative to the slide. The forward or rightward movement of the slide 90, as viewed in FIGS. 2 and 4, will advance the tool storage magazine 25 so that the forward empty socket 65A will engage the tool presented by a spindle located in the tool change station. The tool storage magazine 25 comprises a bell shaped housing 111, as shown in FIGS. 4 and 5, having an axial recess 112. The housing 111 is mounted for vertical and rotational movement about an upstanding elongated hollow circular mounting post 114 integrally formed with the slide 90. A circular plate 80, having the equally spaced sockets 65 formed in its periphery, is securely attached to the bottom surface of the bell housing 111 for movement with it.

To effect axial movement of the tool storage magazine 25, a piston rod 117 is disposed in coaxial relationship within the hollow mounting post 114, and extends outwardly thereof through an axial opening provided in an end cap 118. The bell housing 111 engages a shoulder 121 formed on the upper extending end of the piston rod 117 and is secured thereto by means of a nut 124. Thus, axial movement of the piston rod 117 will effect like movement of the bell housing 111.

The lower end of the piston rod 117 is slidably mounted in an axial bore 126 formed in a sleeve 127, as clearly shown in FIG. 5. A radially extending circular flange 128 integrally formed on the sleeve 127 snuggly fits within the axial opening of the post 114 and serves as the lower end cap so that the interior of the post is closed at both ends and serves as a fluid cylinder 129. A piston 131 supported for reciprocal movement in the cylinder 129 is securely attached to the piston rod 117 to effect its axial movement. The piston 131 and cylinder 129 constitute a piston and cylinder mechanism 130 for actuating the magazine 25 in its vertical movement. Upward movement is effected by supplying fluid under pressure from a reservoir 557, shown schematically in FIG. 22, through a connected fluid line 133 connected to the outer end of a drilled passage 134 in the slide 90; the opposite end of the drilled passage 134 is in communication with a chamber 135. On the other hand, fluid under pressure supplied to a chamber 136 above the piston 131, via a connecting fluid conduit 137 registering with the outer end of another passage 138 drilled in the slide 90, the opposite end of which communicates with the upper end of the chamber 136, will cause downward movement of the piston 131, rod 117 and magazine 25.

The axial position of the magazine 25 is indicated in the electrical control system by a pair of limit switches 140 and 141 that are adjustably carried in vertical spaced apart relationship on the forwardly extending end of a bracket 142 that is secured to the right side of the column 22, as shown in FIGS. 1, 6 and 21. The limit switches 140 and 141 are actuated by a dog 143 that is adjustably secured to an axially movable rod 144 which is slidably supported within a bore of a housing 145 that is secured in a vertical recess 146 formed in the upper right side of the column 22. The dog 143 extends outwardly of the housing 145 through a vertical slot 147 formed in the wall of the housing. A spring 148, mounted about the upper portion of the rod 144 and located in a counterbore 149 of the housing, is disposed to engage a collar 150 that is secured to the rod 144 and operates to constantly urge the rod in an upward direction.

The upper end of the rod 144 extends outwardly of the housing 145 and is provided with an L-shaped bracket 169, best seen in FIG. 21. A horizontally disposed stub shaft 170 is secured to the upper end of the vertical leg of the bracket 169 and rotatably supports a roller 171 which is adapted to engage the under surface of the circular support 80. Thus, when the magazine 25 is in its normal lowermost position, as shown in FIG. 1, the support plate 80 will force the rod 144 inwardly into the housing 145, compressing the spring 148. The dog 143 moves with the rod 144 for actuating the switch 140, as shown in FIGS. 1 and 21. The actuated switch 140 indicates in the electrical control system that the magazine 25 is in its lowermost position. It will be noted that the housing 145 is located in a position so that the roller 170 is disposed to engage the under surface of the circular support plate 80 when the magazine 25 is in its lowermost position, either in a retracted ready position or when it has been advanced into the tool change station. In either of the lowermost positions of the magazine, the roller engages the undersurface of the circular support member so that the dog 143 maintains the switch 140 actuated. As the magazine 25 is moved axially upwardly to withdraw a tool from the spindle that is positioned in the tool change station 75, the spring 148 operates to move the rod 144 upwardly. The dog 143 moves upwardly with the rod until such time as the magazine 25 has been moved axially to its uppermost limit of travel. With the magazine 25 fully elevated, the dog 143 will be positioned to engage the plunger of the limit switch 141 to actuate the switch which operates to indicate in the electrical control system that the magazine 25 is in its elevated position.

Rotational indexing movement of the magazine 25 is effected by means of a Geneva drive, best shown in FIGS. 5 and 6. As there shown, the Geneva drive comprises an index gear 151 which is rotatably mounted on a depending hub 152 integrally formed with the slide 90 and concentric with the mounting post 114. The gear 151 is connected to drive the sleeve 127, which supports the lower end of the piston rod 117, by means of a driving sleeve 153. As shown in FIG. 5, the driving sleeve 153 is mounted on a reduced lower portion of the piston rod supporting sleeve 127 and is drivingly connected thereto by means of a key 154. An integrally formed radially extending circular flange 155 formed on the driving sleeve 153 abuts against the axial end of the slide hub 152 and also extends radially sufficiently far to support the gear 151 in its operative position, being secured to the flange 155 by means of screws. The index gear 151 and the driving sleeve 153 are maintained in operative position by means of a locking nut 156 which is engaged on a threaded lower end 157 of the supporting sleeve 127.

The rotational indexing drive imparted by the gear 151 to the driving sleeve 153 and thence to the supporting sleeve 127 through the key 154, is transmitted to the piston rod 117 by a key 158 carried by the piston rod 117 and slidable in a relatively long keyway 159 formed in the wall of the axial bore 126 of the sleeve. Thus, upon axial upward movement of the piston rod 117, the key 158 will move with the rod sliding in the keyway 159 to maintain the driving connection therebetween. The indexing drive effected by the index gear 151 is imparted to the magazine bell housing 111 by means of another key 160 carried in the reduced upper end 119 of the rod and engaged in a keyway 161 formed in the surface of the axial opening 122 of the housing 111.

Power for driving the tool storage magazine 25 in an indexing movement is obtained from a motor 162 that is detachably secured to the top surface 86 of the column 22. As shown in FIGS. 4 and 6, a worm drive transmission housing 163 secured to the motor frame rotatably supports a worm 164 which is connected to be driven by the motor drive shaft (not shown) in a well known manner. A worm gear 165 having a splined axial opening (not shown) is journaled in the housing 163 in meshing engagement with the worm 164. A relatively long drive shaft 166 having a rearwardly extending splined end 167 is slidably supported in the housing 161 in splined engagement with the worm gear 165. The drive shaft 166 extends forwardly or rightwardly, as viewed in FIGS. 4 and 6, and through an opening 168 formed in the rear wall of the base 85 and is journalled in a worm drive housing 172. The forward end of the drive shaft 166 extends into a suitable opening formed in the forward wall of the housing 172 and is secured therein so that it is free to rotate relative to the housing but will move axially with the movement of the slide. As shown in FIGS. 6 and 7, the worm drive housing 172 is secured to the bottom surface of the slide 90 so that it will move with the slide. The housing 172, in turn, will operate to move the splined drive shaft 166 axially with it. By reason of the extensible connection established between the splined end of the shaft 166 and the worm gear 165, a driving connection from the motor 162 to the drive shaft 166 is maintained for any extended position of the drive shaft. A worm 173, keyed to the portion of the drive shaft 166 within the housing 172, is disposed in driving engagement with a worm gear 174. The worm gear 174, in turn, is mounted on a splined shaft 176 journaled in the housing 172 with its uppermost end being spline connected to a depending hub 177 of a rotatable cam plate 178 of the Geneva drive. Thus, an extensible drive transmission is established from the motor 162 to the Geneva drive mechanism, and with the magazine 25 elevated, selective indexible movement of a preselected tool into the tool change station 75 may be effected.

The Geneva drive mechanism comprises the Geneva gear 151 and the cooperating rotatable cam plate 178, which is connected to be driven by the motor 162. As shown in FIG. 6, the driven Geneva index gear 151 is provided with a plurality of peripherally equally spaced arcuate notches 181 corresponding in number to the number of storage sockets 65 provided in the tool storage magazine 25, which in this particular embodiment is twelve. It is apparent, as clearly shown in FIGS. 4 and 5, that the Geneva index gear 151 and the tool storage magazine 25 are disposed to rotate about the same vertical axis. The Geneva index gear 151 is angularly orientated with respect to the magazine 25 so that the angular disposition of each notch 181 of the index gear 151 corresponds to the angular disposition of the sockets 65. Furthermore, the magazine 25 is positioned so that when it is stationary, the axis of its path of travel passes through the center of a forwardly located empty socket 65A, as illustrated in FIG. 3.

When the empty socket 65A is in the ready position, as illustrated in FIG. 3, the index gear 151 is in the position shown in FIG. 6, with its arcuate notch 181A engaged by a complementary arcuate surface 185 of a projection 182 for accurately locating and retaining the index gear 151 in the desired index position. The projection 182 is secured to the cam plate along with a crank pin 183, but in spaced relationship thereto, and the arcuate surface 185 of the projection 182 is concentric with the axis of rotation of the cam plate 178 for cooperation with the arcuate notches 181 on the index gear 151.

In order to index the magazine 25 one increment, the cam plate 178 is rotated 360°. As this occurs, the arcuate surface 185 of the projection 182 is rotated out of engagement with the notch 181A to release the gear 151 for an indexing movement. The circular path of travel of the crank pin 183 moves it into one of a plurality of radial drive slots 184 formed in the index gear 151. Continued movement of the crank pin 183 causes rotation of the gear 151 until the crank pin 183 leaves the radial slot 184 after it has rotated the gear 151 through a single increment of indexing movement. As the pin 183 leaves the slot 184, the arcuate surface 185 of the projection 182 moves into engagement with the succeeding arcuate notch 181B for precisely locating and retaining the index gear 151 and its associated mechanism in the new index position.

When indexing has been accomplished, a limit switch 187, shown in FIGS. 5 and 6, is deactuated to stop the operation of the motor 162 and indicate in the electrical circuit that indexing of the magazine 25 has been completed. Such operation of the limit switch 187 is accomplished by means of an index stop ring 188 which is disposed in a circular recess 189 formed in the under surface of the slide 90 and secured in coaxial relationship to the index gear 151, as shown in FIG. 5. The stop ring 188 is provided with twelve equally spaced peripheral notches 191, as shown in FIG. 8, with the ring 188 being oriented relative to the index gear 151 so that the angular spacing of the notches 191 coincide with the angular spacing of the locating notches 181 of the index gear 151. A plunger 193 slidably disposed in a horizontal bore 194 formed in the slide 90 is provided with an inwardly extending finger 195 which is adapted to engage in the notches 191 of the stop ring 188. A spring 196 disposed on a reduced outwardly extending switch actuating portion 197 of the plunger 93, constantly urges the plunger towards the periphery of the stop ring 188. The spring 196 abuts a shoulder formed by the reduced portion 197 and is confined within the bore 194 under compression by means of a plug 198 threadedly engaged in the outer end of the bore and through which the actuating portion 197 extends. As shown in FIGS. 5 and 8, the outwardly extending end of the rod 197 is disposed in axial alignment with the actuating plunger of the limit switch 187 which is secured to a bracket 199 that is attached to the side of the slide 90. In operation, as the motor 162 operates to drive the Geneva drive mechanism, the stop ring 188 will also be rotated. As the stop ring 188 rotates, it will force the plunger 193 to move out of engagement with the notch that it had been in registration with, and the plunger will ride on the peripheral surface of the stop ring to actuate the limit switch 187. When an indexing movement has been completed, the plunger will move inwardly into registration with the next notch thereby deactuating the limit switch 187 which, in turn, operates to stop the drive motor 162.

As previously mentioned, the tool changer apparatus 24 is normally located in a ready position so that it does not interfere with the indexing movement of the spindle head 26. The tools carried by the magazine 25 are disposed within the sockets 65 in inverted position with the shanks of the tools depending from the socket plate 80, as illustrated in FIG. 2. With this arrangement, when the magazine 25 is moved to the ready position, the tools, such as tools 53 and 63, shown in FIG. 3, that are located on either side of the empty socket 65A, would engage the forward extending ends of the ways 87 and 88 and would be ejected from their respective sockets. To accommodate tools carried in sockets located in these particular positions, as shown in FIG. 1, the forward ends of the ways 87 and 88 are provided with recesses 205 and 206, respectively, of sufficient depth to provide clearance for the shank of the tools carried by sockets located in these positions when the magazine 25 is in the ready position. The forward ends of the guideways 91 and 92 of the slide 90 are also provided with semicircular recesses 207 and 208 which provided clearance for the tools carried by the sockets when the magazine 25 is in the ready position. Similarly, clearance passages 211 and 212 are provided in the rear portions of the ways 87 and 88, respectively, of the base 85. The passages 211 and 212 are of sufficient length to accommodate the movement of the slide 90 in positioning the tool storage magazine 25 into the tool change station 75. The rear ends of the guideways 91 and 92 are also provided with semicircular clearance recesses, of which only a recess 213 of the guideway 87 is shown. Since the magazine 25 moves forwardly, a passage 214 is also provided in the vertical rear wall of the base 85, to provide for the passage of a tool, such as the tool 58, carried by the most rearwardly located socket 65.

As previously mentioned, the spindle head 26 is supported for indexable movement for locating the spindles 35 and 36 in the tool change station 75 and the operating station 74, alternately, so that one spindle may be operated in performing a work operation, while the tool in the opposite spindle is being changed. To this end, as shown in FIGS. 1 and 4, a mounting plate 221 is provided and is secured in an opening 222 formed in the front face of the column 22 by means of a plurality of bolts 223. The mounting plate 221 presents an outwardly extending circular supporting way 224 having an axial opening 226. The spindle head 26 is provided with a rearwardly extending neck portion 227 having a rearwardly extending axial hub 228 that is journaled in a pair of bearings 229 which are disposed in the axial opening 226 of the mounting plate 221. A circular guideway 232 formed on the neck portion 227 of the spindle head is cooperatively engaged on the circular way 224 of the mounting plate for guiding and supporting the spindle head 26 in its rotational movement. A split retaining ring 233 securely fastened to the circular end face of the circular spindle head guideway 232 cooperates with the circular way 224 of the mounting plate 221 to retain the spindle head in operative position on the mounting plate 221.

The spindle head 26 is rotatably driven in an indexing movement by power through the operation of a motor 380, shown in FIGS. 5 and 13. The motor 380 is detachably secured to a boss provided on the external right side surface of the column 22. An output shaft 381 of the motor 380 extends inwardly into the interior of the column and is coupled to a gear shaft 382 that is rotatably journaled in a supporting sleeve 383. A bevel gear 384 integrally formed on the inner end of the shaft 382 is disposed in meshing engagement with a bevel gear 385 that is keyed to the end of a spindle head drive shaft 386. The shaft 386 is supported in a sleeve 387 which is disposed in a suitable opening formed in the mounting plate 221, being journaled therein by a pair of antifriction bearings 388. Integrally formed on the end of the shaft 386 is a gear 389 adapted to be meshingly engaged with a relatively large spindle head bull gear 390. As shown in FIG. 4, the bull gear 390 is supported in coaxial relationship on a circular flange 391 of a bearing sleeve 392 which is disposed in the axial opening 230 of the spindle head hub 228. Both the bull gear 390 and the bearing sleeve 392 are secured to the axial end face of the spindle head hub 228. As a result, actuation of the motor 380 will serve to rotate the bull gear 390 and thereby the spindle head 26, the spindle head 26 rotating relative to the mounting plate 221 in the bearings 229.

Accurate location of the spindle head 26 in an index position is accomplished by the registration of an index locating plunger 412 in either one of two openings 416 or 417. The openings 416 and 417 are formed in the retaining ring 233, diametrically opposite each other. Operation of the index plunger 412 is effected by an associated fluid actuator 418, in a manner to be subsequently described.

The tool carrying spindles 35 and 36 are adapted to cooperate with the tool changing mechanism 24 so that a tool inserted into the spindle located in the tool change station 75 by the magazine 25 will be automatically locked in the spindle for performing a machining operation and may also be operated automatically to release a tool so that the previously used tool will be withdrawn from it by the magazine 25. The spindle 35 is illustrated in detail in FIG. 12, and a description of the spindle 35 will also apply to the spindle 36, since both spindles are constructed and arranged within the spindle head 26 in the same manner. The spindle 35 is journaled in a sleeve 234 that is secured within a radial opening 235 formed in the spindle head 26, being rotatably supported at its forward end by a pair of bearings 236 and at its rearward end by a pair of bearings 237. A spindle driving bevel gear 241 is keyed to the spindle 35 at its rearward end adjacent the bearings 237 and is disposed within a compartment 238 formed in the spindle head. The spindle head gear 241 is connected to be driven by a bevel gear 242 also located within the compartment 238 and is a part of a drive transmission to be subsequently described.

The forward end of the spindle 35 is provided with a tapered opening 246 for receiving a collet 247 that includes a complementary tapered portion 248 for engagement with the tapered opening 246 of the spindle 35. The collet 247 is provided with a concentric bore 249 for receiving a cylindrical shank 251 of a tool and is arranged so that it may be compressed about the cylindrical shank 251, in a well-known manner, for clamping the tool in the spindle 35. Compression of the collet 247 for locking a tool therein is achieved by drawing the collet rearwardly to move it into the tapered opening 246 of the spindle 35 so that the complementary tapered portions operate to compress the collet 247 as it is drawn rearwardly. To release the tool, of course, the collet 247 is moved forwardly a slight amount within the tapered portion 246 to relieve the pressure upon the cylindrical shank 251 of the tool for releasing the tool and permitting the tool to be withdrawn from the spindle. However, it has been found that during work operations with some types of cutting tools, axial thrust forces are developed which act upon the tool and tend to pull the tool out of the operating spindle. To prevent such action from occurring, and also to actuate the collet in a gripping and releasing action, a novel automatic tool holding and locking apparatus has been provided, which is operative to effect movement of the collet 247 in a tool clamping or releasing action and also to lock the tool within the collet to positively hold the tool from moving axially outwardly of the spindle.

Figure 12:
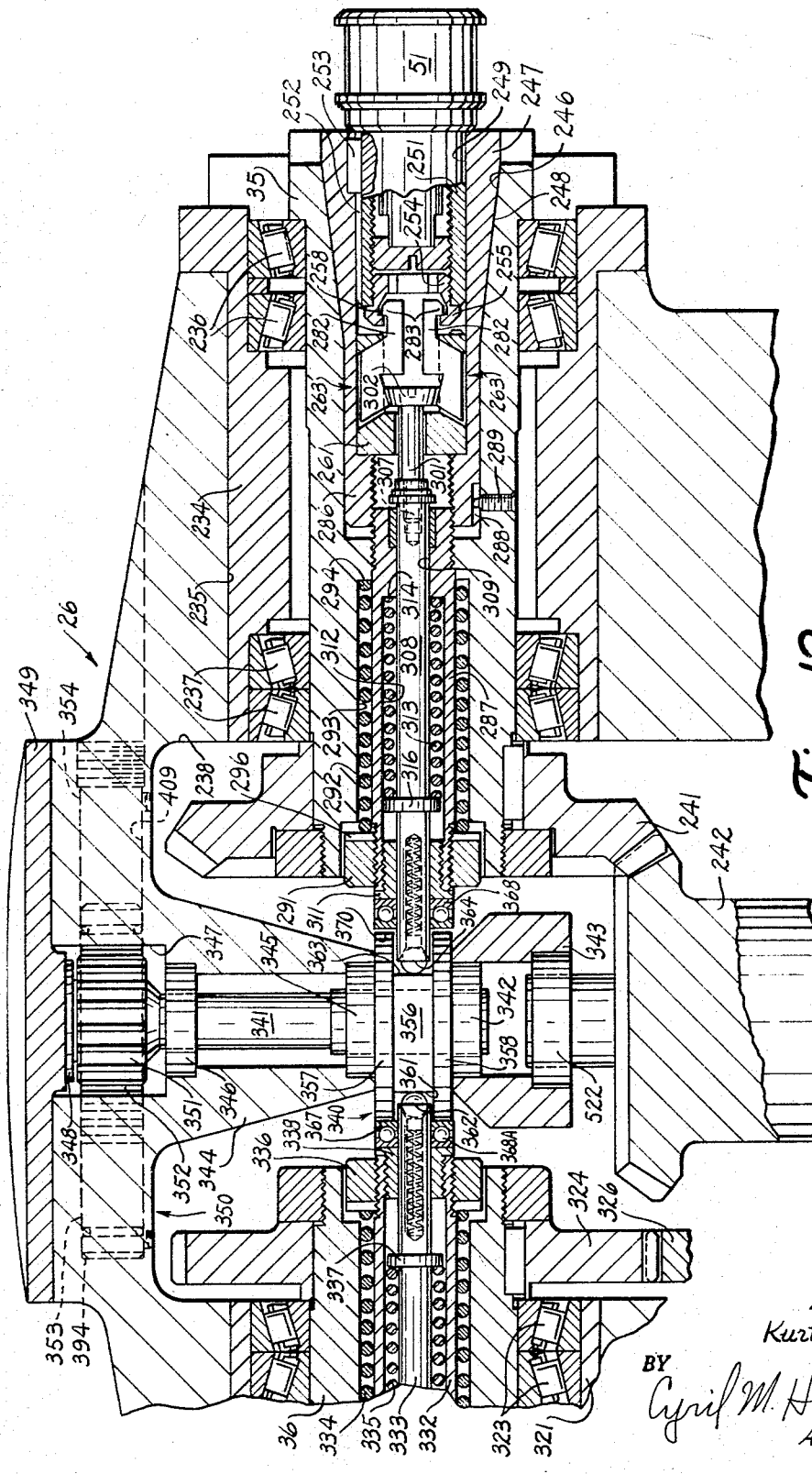
FIG. 12 is an enlarged fragmentary detail view substantially in vertical section taken through the spindle head and showing details of the novel tool locking and clamping mechanism of one of the spindles, and the actuating mechanism for effecting the simultaneous operation of the tool locking and clamping mechanisms of both spindles.

To this end, as shown generally in FIG. 12 and in detail in FIG. 14, the cylindrical shank 251 of the tool is provided with an internal thread for threadedly receiving an externally threaded coupling 254 having a radially extending flange head portion 255. The coupling 254 is provided with a concentric bore 256, a portion of which is enlarged to form a chamber 257. By enlarging the bore 256 to form the chamber 257, an inwardly facing shoulder 258 is provided which serves as a gripping surface for the tool locking means. The locking means, in general, comprise a cylindrical guide block 261 having a concentric bore 262. Two radially and axially movable tool gripping members 263 are supported in the guide block 261 along inclined radial paths of travel so that they move towards and away from the axis of the collet 247, as well as axially. The gripping members 263, as depicted in FIGS. 14 and 16, are constructed with vertical guides 264 which are disposed to move within vertical slots 266, shown in FIGS. 14 and 15, that are formed in the guide block 261. The slots 266 are formed diametrically opposite to each other and extend inwardly to the bore 262. The vertical guides 264 cooperate with the slots 266 to maintain the guide members 263 in upright position as they move radially and axially. As clearly illustrated in FIG. 16, each gripping member 263 is provided with a pair of laterally extending angularly inclined guides 267 and 268, which present upper inclined slide surfaces 274 and 275 respectively. The guides 267 and 268 are disposed to move within complementary guideways 269 and 271 formed at the lower end of each vertical slot 266, as depicted in FIG. 15. As shown in FIGS. 14 and 15, the guideways 269 and 271 present downwardly facing inclined slide surfaces 284 and 285, which are adapted to be engaged by the inclined slide surfaces 274 and 275 of the guides 267 and 268 upon the application of an axial upwardly acting force to the gripping members. When such force is applied to the gripping members, the inclined surfaces 274 and 275 of the guides 267 and 268 of each gripping member slide along the inclined faces 284 and 285 of the guideways 269 and 271. As a result, the gripping member 263 will move upwardly as well as radially outwardly, being maintained in vertical position by the vertical guides 264 moving in the slots 266.

A circular end cap 272, having an axial opening 273, is provided for the end of the guide block 261 which is adjacent the collet 247. Two axially extending projections 276 and 277, having inclined machined surfaces 278 formed on their inner ends, are parallel to the inclined surfaces 274 and 275 and cooperate therewith for establishing an inclined path of travel for the vertical guides 264 to produce the desired movement of the gripping members 263. The guide block 261, end cap 272, and the associated gripping members, are operably retained in the bore 249 of the collet 247 by means of a plurality of screws 281, one of which is shown. These screws 281 are adapted to extend through registering openings formed in the end cap 272 and guide block 261 into threaded engnagement in suitable threaded openings provided in the inner end of the collet 247. Axially depending arms 282 of the gripping members 263 extend outwardly of the guide block 261 through the axial opening 273 of the end cap 272 and into the chamber 257 of the coupling 254. The depending arms 282 are operable to effect a locking of the tool in the collet 247. To this end, the extreme lower end of each arm 282 is formed with an outwardly extending flange 283 which is adapted to positively engage with the inwardly facing gripping surface of the annular shoulder 258 of the coupling 254. This locking engagement is effected by the rearward and radial outward movement of the gripping members 263. Such engagement of the gripping members 263 with the tool will positively lock the tool in the collet 247.

In FIG. 14, the gripping members 263 are illustrated by the solid lines in their actuated positions in which they operate to lock the tool within the collet 247. As previously described, the gripping members 263 are movable inwardly and downwardly within the guide block 261 into the position depicted by the broken lines in FIG. 14. In this position, the adjacent vertical faces of the depending arms 282 and the flange 283 of each arm is moved out of gripping engagement with the gripping surface of the shoulder 258 of the coupling 254 to release the tool that is disposed within the collet 247.

The collet 247 includes a rearwardly extending cylindrical portion 286 which is provided with an internal thread at its rearmost end for engaging the forward threaded end of a drawbar 287, as shown in FIG. 12. In addition to being in threaded engagement with the drawbar 287, the cylindrical portion 286 of the collet 247 is provided with a slot 288 which extends parallel to the axis of the collet and is engaged by the end of a set screw 289. The set screw 289 is threaded into the wall of the spindle 35 so that its end extends into the slot 288 to permit limited sliding axial movement of the collet 247 relative to the spindle 35. However, the set screw 289 serves to prevent the collet from rotating relative to the drawbar 287 so that it will not lose its threaded connection therewith.

The drawbar 287 is disposed within the longitudinal bore of the spindle 35 and serves to transmit the force which moves the collet 247 axially for either applying a collet clamping force to the tool or releasing the clamping force applied by the collet to the tool. To this end, the drawbar 287 extends rearwardly of the collet 247 beyond the bevel gear 241, and its rear extremity is provided with a thread for threadedly receiving a collar 291. The drawbar 287 is yieldably urged rearwardly of the spindle 35 by a spring 292 mounted about the drawbar and housed within a counterbore 293 formed in the spindle 35. One end of the spring bears against a shoulder 294 formed by the bore of the spindle and the counterbore 293. Opposite end of the spring 292 bears against the collar 291 through a thrust washer 296, the spring 292 being under compression so that it normally urges the collar 291 and the drawbar 287, to which the collar is attached, rearwardly of the spindle. This force in the rearward direction applied by the spring 292 to the collet 247 through the drawbar 287 serves to draw the collet 247 tightly into the tapered portion 246 of the spindle to cause the collet to contract for clamping a tool therein.

Actuation of the gripping members 263 in a tool locking and releasing action is accomplished by means of an actuating rod 301 having a frusto-conical head portion 302 disposed within the bore 262 of the guide book 261, as shown in FIG. 12. Within the bore 262, the conical surface of the head portion of 302 is adapted to slidably engage inwardly inclined surfaces 303 formed on the inner faces of the vertical guide portions 264 of the gripping members 263. The angular inclination of the surfaces 303 is complementary to the angle of the taper of the peripheral surface of the head 302. In forming the surfaces 303 in each of the gripping members 263, a horizontal surface or shoulder 304 is formed which serves as an abutting surface against which the adjacent axial end face of the frusto-conical head portion 302 will engage when a downwardly acting force is applied to the rod 301. When the actuating rod 301 is moved axially rightwardly, as viewed in FIG. 12, or downwardly as viewed in FIG. 14, the head portion 302 thereof is moved into engagement with the horizontal surfaces 304 of the gripping members 263. This initial downward movement of the head 302 into engagement with the horizontal surfaces 304 of the gripping members 263 will position the head 302 so that its peripheral surface is moved out of engagement with the inclined surfaces 303 of the gripping members 263, as illustrated by the broken lines in FIG. 14. As the applied force continues to act on the rod 301, the head will transmit this force to the horizontal surfaces 304 of the gripping members urging them axially downwardly. However, the lateral guides 267 and 268 of the gripping members will slide in the angularly disposed guideways 269 and 271 of the guide block causing the gripping members 263 to move inwardly towards the axis of the spindle as they move axially downwardly. This movement of the gripping members 263 continues until the adjacent vertical surfaces of the arm portions 282 of the gripping members 263 abut, as indicated by the broken lines in FIG. 14. The simultaneous downward and inward movement of the gripping members 263 into abutting engagement will move the flange 283 of each arm 282 out of engagement with the gripping surface of the circular shoulder 258 of the tool and retract the flanges 283 radially inwardly releasing the tool.

In a tool locking action, a force in the opposite direction applied to the rod 301 will cause the rod 301 and its associated head portion 302 to move axially upwardly, as viewed in FIG. 14. Thereupon, the peripheral surface of the head portion 302 of the rod 301 engages the inclined surfaces 303 of the gripping members 263. This action causes the gripping members 263 to move outwardly away from each other and also to move upwardly, as viewed in FIG. 14. Thereupon, the flanges 283 of the arms 282 forcefully engage the gripping surface of the circular shoulder 258 of the tool coupling 254 thereby applying an axial rearwardly acting locking force to the tool in the collet 247.

The rod 301 extends rearwardly through the axial opening formed in the head of the buide block 261 and includes a threaded reduced portion 307 which is threadedly engaged in a threaded bore provided in the forward extending end of a second drawbar 308. The drawbar 308 is disposed within a longitudinal concentric bore 309 of the collet drawbar 297 and serves to transmit the force which moves the actuating rod 301 for operating the gripping members 263 for releasing and locking a tool in the collet 247. To this end, the drawbar 308 extends rearwardly of the collet 247 beyond the rearwardly extending end of the collet drawbar 287 and through a retainer 311 that is threadedly engaged in a counterbore 312 of the collet drawbar 287. The drawbar 308 is yieldably urged rearwardly of the spindle 35 by a spring 313 that is disposed about the drawbar 308 and located within the counterbore 312 of the collet drawbar 287. One end of the spring 313 bears against a shoulder 314 formed by the counterbore 312 in the collet drawbar 287. The opposite end of the spring 313 bears against a radially extending collar 316 integrally formed with the drawbar 308, the arrangement being such that the drawbar 308 is normally urged rearwardly of the spindle. This force in a rearward direction applied by the spring 313 to the actuating rod 301 through the drawbar 308 serves to move the gripping members 263 rearwardly and outwardly through the operation of the frusto-conical head portion 302 of the actuating rod 301 to positively lock a tool in the collet 247 against axial outward movement.

FIG. 18 illustrates an alternate arrangement of the novel tool gripping members in which a modified arrangement for actuating the gripping members into tool engagement and releasing action is provided. In this embodiment, a pair of gripping members 420, having the same general configuration as the gripping members 263, are supported for guided movement in the pair of guideways 266 formed in the guide block 261. Each gripping member 420 is provided with a vertical guide 421 disposed within the vertical guideways 266 of the block 261 and a pair of laterally extending angularly inclined guides 422, only one of which is known for each gripping member. These lateral guides are disposed within the angular lateral guideways 269 and 271 of the block 261 and present upper inclined slide surfaces 429 that cooperate with the downwardly facing inclined slide surfaces 284 and 285 of the guideways 269 and 271 so that the gripping members move radially outwardly or inwardly towards or away from the axis of the collet 247 as they move axially upwardly or downwardly. Each gripping member as an axially depending arm 423 formed at its face end with a laterally extending flange 424 which is adapted to engage with the gripping surface of the circular shoulder 258 of the coupling 254 that is threadedly connected in the cylindrical shank 251 of a tool. However, actuation of the gripping members 420 into tool gripping engagement, as shown by the full lines in FIG. 18, from a released position, as indicated by the broken lines in FIG. 18, is accomplished by means of a rod 425. At its forward end, the rod 425 is provided with a chisel edge 426 having concave side surfaces 427 and 428 which intersect angular pressure surfaces 431 and 432, respectively. The angular pressure surfaces 431 and 432 are constructed and arranged to engage complementary angular surfaces 433 and 434 formed on adjacent inner ends of the vertical guides 421 of each of the gripping members. The gripping members 420 are each urged inwardly towards the axis of the collet 247 into abutting relationship, as indicated by the broken lines in FIG. 18, by a plunger 436 slidably disposed within a bore 437 formed in the vertical guide portion 421 of each gripping member. The plunger 436 is urged outwardly of the bore by means of a spring 438 so that the outward end of the plunger engages against the surface of the collet bore in which the guide block 261 is disposed. With the plunger 436 in engagement with the surface of the bore, the force of the spring 438 will act on the gripping member 420 urging it inwardly towards the axis of the collet. As the gripping member 420 moves inwardly by the action of the spring 438, it is guided in such movement by the lateral guide 422 which is slidable in the guideways 269 and 271 of the guide block 261. As the gripping members 420 move inwardly towards the axis of the collet 247 they also move downwardly by operation of the inclined slide surfaces 429 of the inclined guides 422 cooperating with the inclined slide surfaces 284 and 285 of the block 261, as well as by the cooperation of the parallel inclined surfaces 274 and 275 of the end cap 272, which slidably engages the under surface of the gripping members 420. As the gripping members 420 move inwardly and downwardly, the flange portions 424 of each arm 423 also move downwardly and inwardly out of engagement with the gripping surface of the circular shoulder 258 of the coupling 254 releasing the tool. The position of the gripping members 420, when in tool releasing position, is indicated by the broken lines in FIG. 18.

When it is desired to move the gripping members 420 in a tool locking action, a force is applied to the rod 425 to move it downwardly from its retracted position, indicated by the broken lines in FIG. 18. As the rod moves downwardly, the chisel edge 426 of the rod 425 enters into the space formed by the divergent surfaces 433 and 434 of the gripping members so that the adjacent concave side surfaces 427 and 428 will engage the angular outwardly inclined surfaces 433 and 434 of the gripping members 420. This initial entrance of the chisel edge of the rod 425 between the gripping members 420 will serve to start the gripping members moving outwardly and upwardly and provide clearance for the entry of the inclined pressure surfaces 431 and 432 into engagement with the surfaces 433 and 434 of the gripping members. As the rod 425 continues to move downwardly, a greater area of the pressure surfaces 431 and 432 is gradually engaged with a greater area of the surfaces 433 and 434 until such time as the flanges 424 of the arm portion 423 of the gripping members 420 firmly engage the gripping surface of the circular shoulder 258 of the coupling 254 to effect positive axial locking of the tool.

The tool 425 extends rearwardly through the axial opening formed in the head of the guide block 261 and is adapted to be threadedly connected to the forwardly extending end of the drawbar 308 in the same manner as previously described in conjunction with the rod 301. However when the drawbar 308 is urged leftwardly, as viewed in FIG. 12, by operation of the spring 313, it actuates the rod 425 to effect operation of the gripping member 420 in a tool releasing operation rather than a tool clamping, as is the case when the drawbar is associated with the rod 301.

As previously mentioned, the spindle 36 is identical in construction and operation to the spindle 35 and is provided with exactly the same arrangement for contracting and releasing its associated collet and for locking a tool in the collet against axial outward movement. Thus, as shown in FIGS. 4 and 12, the spindle 36 is journaled in a sleeve 321, being rotatably supported therein at its forward end by a pair of bearings 322 and at its rearward end by a pair of bearings 323. A spur gear 324 is keyed to the spindle 36 at its rearward and adjacent the bearings 323. As shown in FIGS. 4 to 12, the spur gear 324 is disposed in meshing engagement with a power transfer gear 326 which is keyed to the extending end of a shaft 327 that is rotatably journaled in the spindle head 26. The power transfer gear 326 is part of the drive transmission for the spindle 36, which will be subsequently described.

The forward end of the spindle 36 is provided with a tapered socket [not shown] for receiving a collet 331, as shown in FIG. 4. The collet 331 is moved axially by a collet drawbar 332, shown in FIG. 12, identical to the drawbar 287 associated with the collet 247 of the spindle 35. Concentrically arranged in the collet drawbar 332 is a tool gripping drawbar 333 that is operable in the same manner and for the same purpose as the drawbar 308 associated with the spindle 35. Both of the drawbars 332 and 333 are yieldably urged rearwardly of the spindle 36 by means of associated springs 334 and 335 which are arranged for operation in the identical manner as the springs 292 and 313 that are associated with the drawbars 287 and 308 of the spindle 35. Thus, the spring 334 acts on a collar 336 that is threadedly connected to the extreme inner end of the drawbar 332, to urge the drawbar 332 rearwardly of the spindle. In like manner, the drawbar 333 is urged rearwardly by its associated spring 335 acting on a radially extending collar 337 that is integrally formed with the drawbar 333 through a retainer 338 that is threadedly connected to the drawbar 332. The force applied by the spring 334 to the drawbar 332 operates to draw the collet 331 within the spindle 36 to compress it and thereby clamp the tool in the collet. On the other hand, the force applied by the spring 335 to the drawbar 333 operates to move the gripping members 263 associated with the spindle 36 into axial locking engagement with the tool in the spindle.

As previously mentioned, the spindle head 26 is indexable so that a spindle located in the tool change station 75 will be positioned in the operating station 74, while the spindle that was in the operating station 74 will be positioned in the tool change station 75 for a tool change operation. It is apparent that the tool carried by the spindle, which is located in the tool change station 75, must be released so that it may be readily removed and a new tool inserted into the spindle. On the other hand, the tool in the spindle, which is in the operating station 74, must be locked in the operating spindle for performing a work operation. The release of the tool associated with the spindle being moved into the tool change station 75 and the locking of the tool associated with the spindle being moved into the operating station 74 is accomplished simultaneously and at the time that the spindle head 26 has been rotated 90° from the vertical position. When the spindle head 26 has been rotated 90° in an indexing movement, both of the spindles 35 and 36 are disposed so that their axes are in a horizontal plane. Since the tool in the spindle moving to the tool change station is released when the spindle arrives at the horizontal position, it cannot drop out of the spindle. On the other hand, the tool in the spindle moving from the tool change station to the operating station is locked when the spindle arrives at the horizontal position so that it is likewise precluded from dropping out of the spindle.

To effect the simultaneous opposite operation of the collets and gripping members associated with the spindles 35 and 36, a cam member 340, as shown in FIGS. 4, 12 and 17, is keyed to a shaft 341 for rotation therewith. The shaft 341 is supported in the spindle head 26 with its axis coinciding with the axis of rotation of the spindle head 26, its inner end being rotatably supported in a bearing 342 carried by a transversely extending web 343 integrally formed with the spindle head. The shaft 341 extends through an axial opening formed in an inwardly extending projection 344, being journaled therein by a pair of bearings 345 and 346. The shaft 341 extends into a counterbore 347 and has its extreme outer end journaled in a bearing 348 carried in a cover plate 349 of the spindle head. A gear 351 is keyed to the shaft 341 and is in meshing engagement with a gear rack 352 formed on a piston 353 reciprocally disposed in a cylinder 354 of an actuator 350 for imparting rotational movement to the shaft 341. The cam member 340, its associated drive shaft 341, and the piston 353, all rotate bodily with the spindle head 26, and the cam member 340 is also rotatable relative to the spindle head 26 by operation of the piston 353, and is therefore rotatable relative to the spindles 35 and 36.

The cam member 340, as shown in FIGS. 12 and 17, is formed with a center cam 356 and a pair of large cams 357 and 358 which are disposed on either side of the center cam 356. The two cams 357 and 358 are identical and function unitarily. The arrangement of the cam member 340 is best shown in FIG. 17, where only the center cam 356 and one large cam 358 are illustrated since the other large cam 357 is identical to the cam 358. The center cam 356 is generally of circular configuration having a lobe 361 which is constructed and arranged to engage the extending end of one or the other of the drawbars 308 or 333, depending upon the position of the cam member 340. The cam member 340 is illustrated in FIG. 12 with the lobe 361 of the center cam 356 in engagement with the extending end 362 of the drawbar 333 associated with the spindle 36. With the cam member 340 positioned, as shown in FIG. 12, the lobe 361 of the cam 356 engages the end 362 of the drawbar 333 to move the drawbar leftwardly against the force of its associated spring 335, to actuate the gripping members 263 associated with the spindle 36 to release the tool in the spindle. On the other hand, the opposite side of the cam 356 does not engage the end of the drawbar 308 so that the latter is under the influence of its cooperating spring 313 to operate its associated gripping members 316, for locking the tool in the spindle 35.

The outer cams 357 and 358 of the cam member 340 are generally of circular configuration and have a lobe 367 for alternately actuating the two drawbars 332 and 287. In FIGS. 12 and 17, the cam member 340 is illustrated in position so that the two lobes 367 of the two cams 357 and 358 simultaneously engage a thrust bearing 368A for applying an axial force to the end of the collet drawbar 332. Such actuation of the drawbar 332 is against the force of the collet drawbar spring 334 to effect the necessary slight outward movement of the collet associated with the spindle 36 for releasing the tool in the collet. With the cam member 340 positioned, as shown in FIG. 12, wherein the lobes 367 of the outer cams 357 and 358 are simultaneously engaged with the bearing 368A that cooperates with the drawbar 332, the configuration of each cam 357 and 358 is such that a surface 370 of each of the cams 357 and 358, opposite the lobes 367, will not engage an antifriction bearing 368 associated with the extending end of the collet drawbar 287 that operates with the spindle 35. Thus, the spring 292 will continue to urge the drawbar 287 leftwardly, as viewed in FIGS. 12 and 17, for drawing the collet 251 inwardly into the socket 246 of the spindle 35 to actuate the collet for securing the associated tool therein.

For the purpose of describing the operation of the power driven cam member 340 for effecting the simultaneous releasing and locking of the tools respectively associated with the spindles 35 and 36, its operation will be described in conjunction with an indexing movement of the spindle head. The spindle head 26 will be described as being indexed in a clockwise direction, as viewed in FIG. 1, so as to move the spindle 35 into the tool change station 75 and to move the spindle 36 into the operating station 74. It will also be assumed that the cam member 340 is positioned, as shown in FIGS. 4 and 17, so that the lobe 361 of the cam 356 is in engagement with the end of the drawbar 333 associated with the gripping members carried by the spindle 36; while the lobes 367 of the cams 357 and 358 are in engagement with the end of the drawbar 332 associated with the collet 331 of the spindle 36. The motor 380 is operated to rotate the spindle head 26 in an indexing movement. As the spindle head 26 rotates in a clockwise direction, the cam member 340, cam member drive shaft 341, and actuating piston 353, will rotate bodily with the spindle head so that the cam member 340 is retained in the same position relative to the spindles 35 and 36. Thus, when indexing of the spindle head 26 is initiated, the tool 52 associated with the spindle 36, as shown in FIG. 4, is released. On the other hand, the tool 51, associated with the spindle 35, is locked and clamped in the spindle 35 by its associated collet 247. When the spindle head 26 has been rotated 90° from the position illustrated in FIGS. 1 and 4, both spindles will be in a horizontal position and a dog 395 will actuate a limit switch 399. The dog 395, shown in FIGS. 2 and 4, is carried on the extending end of a bracket 396 that is adjustably secured in a circular T-slot 397 formed in the periphery of a collar portion 398 of the spindle head. As the dog 395 moves with the spindle head 26, it engages a plunger of a limit switch 399, shown in FIGS. 1, 3 and 20, to actuate the switch. The limit switch 399 is carried on the forwardly extending end of a bracket 401, which is secured to the right side of the machine column 22, as shown in FIGS. 1, 3 and 6. Actuation of the limit switch 399 will effect the operation of a solenoid to operate a fluid valve, to be subsequently described, for the purpose of supplying fluid pressure to a chamber 394 for moving the cam member actuating piston 353 in a rightward direction, as viewed in FIG. 12. The rightward movement of the piston 353 operates to rotate the cam member 340 180° relative to the inner ends of the spindles 35 and 36. With the cam member 340 rotated 180° from the position shown in FIG. 12, the lobe 361 of the cam 356 and the lobes 367 of the cams 357 and 358, will be moved out of engagement with the ends of the drawbars 333 and 332, respectively, that are associated with the spindle 36. This action will release the drawbars 333 and 332 so that they operate to effect operation of the gripping members carried by the spindle 36 to lock the tool 52 against axial displacement and operate the collet 331 to clamp the tool 52 in the spindle, respectively, as previously described. On the other hand, 180° rotation of the cam member 340 moves the cam lobes 361 and 367 into engagement with the inner ends of the drawbars 308 and 287, respectively, associated with the spindle 35, to effect the operation of the gripping members 263 and the collet 247, associated with the spindle 35, for releasing the tool 51.

As the spindle head indexing motor 380 continues to operate to rotate the spindle head 26 another 90° in a complete 180° of indexing movement, the spindle 36 will be moved from the horizontal position to a downwardly facing vertical position with its associated tool 52 securely locked in the spindle. In like manner, the spindle 35 will be moved from the horizontal position into an upright vertical position but its associated tool 51 will now be released preparatory to a tool change operation. After the cam member 340 has been rotated relative to the spindle by operation of the piston 253 to effect the release of the tool 51 associated with the spindle 35 and to effect the locking and clamping of the tool 52 in its associated spindle 36, the cam member 340 will rotate bodily with the spindle head 26. Therefore, the cam member 340 will operate to maintain the drawbars 308 and 287, associated with the spindle 35, in an outer position so that the gripping members 263 and collet 247 are released and the tool 51 is free to be removed from the spindle upon the subsequent operation of the tool change mechanism 24. Upon completion of 180° of indexing movement of the spindle head 26, a limit switch 402 is actuated to stop the operation of the motor 380. As shown in FIGS. 1, 3 and 20, the limit switch 402 is mounted on the forwardly extending end of a bracket 403 which is secured to the left side of the column 22. The limit switch 402 is actuated by a dog 404 carried by a dog bracket 405 that is adjustably secured to the T-slot 397. As shown in FIGS. 1, 3 and 20, the dog bracket 405 is located on the collar 398 to the right of the spindles 35 and 36, in a position which is 90° from the plane in which the axes of the spindles are located. Thus, as the spindle head 26 is rotated 180° in an indexing movement, the bracket 405 will move with the spindle head into a position adjacent the bracket 403 which is diametrically opposite the position it is shown in FIG. 1. Therefore, when the spindle head 26 has been indexed, the dog 404 will be positioned to engage the plunger of the limit switch 402 to actuate the switch. Actuation of the switch 402 will operate to effect the stopping of the operation of the spindle head indexing motor 380.

A similar control arrangement is provided for controlling the operation of the cam member 340 and stopping the operation of the spindle head indexing motor 380 in a second cycle of spindle head indexing movement wherein the spindle 35 is moved from the tool change station 75 to the operating station 74 and the spindle 36 is moved from the operating station to the tool change station. The operation of the spindle head 26 has been described above as being indexed 180° to locate the spindle 35 in the tool change station 75 and the spindle 36 in the operating station 74. As a result, as previously described, the cam member 340 is positioned so that the lobe 361 of the cam portion 356 and the lobes 367 of the cam portions 357 and 358 are in engagement with the inner ends of the drawbars 308 and 287, respectively, to release the tool in the spindle 35. In a second cycle of indexing movement, the motor 380 is operated to move the spindle head 26 in a clockwise direction in an indexing movement. As the spindle head 26 is rotated, the cam member 340 and its associated drive shaft 341 and actuating piston 353 all rotate bodily with the spindle head 26 so that the cam member 340 remains in the same position relative to the inner end of the spindle 35. When the spindle head 26 is rotated in a clockwise direction, 90° from the vertical position, wherein the spindle 35 is in a horizontal rightwardly facing direction, and the spindle 36 is in a horizontal leftwardly facing position, a limit switch 406 will be actuated. This limit switch is mounted on the forwardly extending end of the bracket 401, as shown in FIG. 20, in a rearwardly spaced apart position relative to the limit switch 399. Actuation of the limit switch 406 is effected by a dog 407, shown in FIGS. 1, 2 and 4, carried on the forwardly extending end of a bracket 408 that is also adjustably secured in the circular T-slot 397. The bracket 408 is located in a position which is diametrically opposite the bracket 395 on which the dog 396 is carried and is in line with the spindle 35 with which the dog 407 is associated. As the spindle head rotates in the second cycle of indexing movement, the dog 407 moves with it and in position to engage the plunger of the limit switch 406 when the spindle 35 has been rotated 90° toward the operating station 74. Actuation of the limit switch 406 will effect the operation of another solenoid, to be described, that is associated with the fluid valve previously mentioned, for the purpose of supplying fluid pressure to a chamber 409, shown in FIG. 12, for moving the cam member actuating piston 353 in the opposite direction into the position it is shown in FIG. 12. This movement of the piston 353 will effect rotation of the cam member 340 through 180° relative to the spindles 35 and 36. Such rotation of the cam member 340 results in positioning the lobes 361 and 367 to release the drawbars 308 and 287 associated with the spindle 35 to effect the locking and clamping of the tool carried by the spindle. However, the lobes 361 and 367 are moved into engagement with the ends of the drawbars 333 and 332, respectively, that are associated with the spindle 36 to effect a release of the tool carried by this spindle. As the spindle head indexing motor 380 continues to operate to rotate the spindle head 26 another 90° to complete the 180° of index movement, the cam member 340 will also rotate bodily with the spindle head 26 to maintain the tool in the spindle 35 in locked and clamped condition.

To stop operation of the spindle head indexing motor 380 when the spindle head 26 has been indexed 180° in a second cycle of operation, the limit switch 402 is again actuated. Such actuation of the limit switch in the second cycle of indexing movement is accomplished by a dog 410, that is carried on a dog bracket 411, that is adjustably secured in the circular T-slot 397. As shown in FIGS. 1 and 20, the dog bracket 411 is located on the periphery of the collar 398 of the spindle head to the left of the spindles 35 and 36. However, in a second cycle of indexing movement, the spindles 35 and 36 are in a position opposite to the position shown in FIGS. 1 and 4. Accordingly, the bracket 411 will be in the position occupied by the bracket 405 in FIG. 1. Therefore, in the second cycle of indexing movement, the bracket 411 is returned to its original position, as shown in FIG. 1. The dog 410, moving with the bracket 411, will be moved into engagement with the plunger of the limit switch 402 for actuating the switch for stopping the operation of the motor 380.

The operation of the collets associated with the spindles 35 and 36 in conjunction with the modified form of the gripping members shown in FIGS. 18 and 19 are effected by means of a cam member 340A illustrated in FIG. 19. The cam member 340A is keyed to the shaft 341 for rotation therewith so that cam member 340A will be operatively driven by the piston 353 through the mechanism previously described for driving the cam member 340.

Cam member 340A, as shown in FIG. 19, is formed with a center cam 356A and a pair of larger cams 357A and 358A which are identical to the cams 357 and 358 previously described in conjunction with FIG. 17. Inasmuch as the cams 357A and 358A function as a single cam, only the cam 358A is shown in FIG. 19. The center cam 356A is generally of a circular configuration having a lobe 361A. The cam 356A has the same configuration as the cam 356 described in conjunction with FIG. 17. However, in the case of cam 356A, it is positioned on the shaft 341 180° from the position of the cam 356 on the shaft 341. Thus the cam 356A is mounted on and keyed to the shaft 341 so that its cam lobe 361A is disposed in engagement with the extending inner end of the actuating shaft 308 associated with the spindle 35. Cam 357A is not shown in FIG. 19 but it has the same configuration as cam 358A which is illustrated therein. The cams 357A and 358A present cam lobes 367A which are disposed to engage the thrust bearing 368A of the draw-in bar 332 that is associated with the collet carried by the spindle 36. Thus, with the cam member 340A arranged, as shown in FIG. 19, wherein the lobe 361A of the cam 356A will operate to apply a force to the end 364 of the actuating rod 308 to force the actuating rod 308 rightwardly, as viewed in FIG. 12, and thereby apply an outwardly acting force to the rod 425 that is associated with the modified gripping members 420, as shown in FIG. 18. This outwardly acting force applied to the rod 425 will move the rod axially to shift the gripping members 420 radially outwardly into gripping engagement with the surface 258 of the coupling 255, as previously described. At the same time, with the cam 358A disposed, as shown in FIG. 19, the peripheral surface of the cam member does not engage thrust bearing 368 associated with the drawbar 287 so that the spring 292 operates to move the drawbar 287 inwardly or leftwardly, as viewed in FIG. 12, thereby operating the collet 247 into clamping engagement with the tool therein. In like manner, the end 362 of the actuating rod 333 associated with the spindle 36 is not engaged by the peripheral surface of the cam 356A so that the spring 335 associated with the actuating rod 333 will operate to move the rod inwardly or rightwardly, as viewed in FIG. 12, its full limit of travel for pulling the rod 425 inwardly or rightwardly. As a result, the gripping members 420 associated with the spindle 36 are urged inwardly by operation of the springs 437 and plungers 436 so that the gripping members 420 are moved inwardly toward the axis of the spindle and downwardly for releasing the tool associated with the collet of the spindle 36. On the other hand, the cam lobe 367A of the cam 358A is disposed to engage the thrust bearing 368A associated with the drawbar 333 so that the cam 358A overcomes the pressure of the spring 335 and causes the draw-in bar to move axially in a leftward direction for releasing the collet associated with the spindle 36.

It is apparent, therefore, that the cams 357A and 358A operate in the same manner as do the cams 357 and 358 associated with the cam member 340. However, the cam 356A associated with the cam member 340A operates opposite to the operation of the cam 356 associated with the cam member 340 insofar as the cam lobe 361A of the cam 356A functions to apply a force to the actuating rods associated with the gripping members 420 for locking the gripping members while the cam lobe 361 of the cam 356 associated with the cam member 340 operates to apply a force to the actuating rods associated with the gripping members 263 to release the gripping members. On the other hand, when the cam lobe 361A of the cam 356A is positioned so as not to apply a force to the actuating rod 425 associated with the gripping members 420, these gripping members are moved to released positions. Conversely, when the cam lobe 361 of the cam 356 associated with the cam member 340 is positioned so as not to apply a force to the actuating rod 301 associated with the gripping members 263, the gripping members are moved into gripping engagement with the end of the tool.

A cycle of operation will be described in which a tool associated with the spindle 35 is assumed to be in the operating station and in clamped condition and the spindle 36 is in the tool change station with its tool released because the cam member 340A is in the position shown in FIG. 19. Therefore, as indexing of the spindle head 26 begins, the tool 52 associated with the spindle 36 is released and the tool 51 associated with the spindle 35 is locked against axial displacement as well as being clamped by the associated collet 247. When the spindle head 26 has been rotated 90° from the position shown in FIGS. 1 and 4, the spindle 36 will be positioned to extend horizontally in a rightward direction and the spindle 35 will be positioned to extend horizontally in a leftward direction. In this position of the spindle head 26, the dog 395, shown in FIGS. 2 and 4, carried by the bracket 396 and which moved with the spindle head is positioned to engage the plunger of the limit switch 399 to actuate the switch for effecting rightward movement of the piston 353, as viewed in FIG. 12. Rightward movement of the piston 353 operates to rotate the cam member 340A 180° relative to the spindles 35 and 36. With the cam member 340A rotated 180° from the position shown in FIG. 19, the lobe 361A of the cam 356A will be moved out of engagement with the end of the actuating rod 308 associated with the spindle 35 while the cam 367A associated with the cam 358A is moved into engagement with the end of the drawbar 287 associated with spindle 35. This action will release the actuating rod 308 so that the spring 292 operates to draw the actuating rod and the connected rod 425 inwardly to release the gripping members 420. On the other hand, when the cam lobe 367A of the cam member 358A is moved into engagement with the end of the drawbar 287, it overcomes the force of the spring 313 to move the drawbar axially in a direction to release the collet 247 associated with the spindle 35. Therefore, the tool 51 associated with the spindle 35 is released.

On the other hand, the cam lobe 361A of the cam 356A is now positioned to engage the end of the actuating rod 333 so that it exerts a pressure on the rod to overcome the force of the spring 335 moving the actuating rod 425 outwardly thereby moving the gripping members 420 into tool gripping engagement for axially locking the tool in the spindle 36. In addition, the cam 358A is positioned so that its peripheral surface does not engage the adjacent end of the draw bar 332 so that the spring 334 operates to move the drawbar 368 inwardly to operate the collet associated with the spindle 36 in a clamping action. Thus, the tool associated with the spindle 36 is locked against outward movement by the gripping members 420 and is also clamped in the spindle by the collet associated with the spindle. With this condition obtained when the spindle head 26 is rotated another 90° so that the spindle 36 is in the operating station, its tool is securely locked in the spindle while the tool in the spindle 35 moving into the tool change station will be released.

The actuation of the previously described limit switch 402 also operates to effect the operation of another solenoid actuated valve for the purpose of regulating a fluid actuator 418 which operates an index position locating plunger 412, shown in FIG. 4, for the purpose of insuring that the spindle head 26 is accurately located in the indexed position. The index locating plunger 412 is secured for axial reciprocation to a piston 413 slidably supported in a bore 414 formed in the mounting plate 221. The plunger 412 extends outwardly from the piston 413 through an end cap 415 that seals one end of the cylinder 414. The outwardly extending tapered end of the plunger 412 moves rightwardly with its associated piston 413 for entering an opening 416 formed in the retainer ring 233 to effect the precise positioning of the spindle head 26 in an indexed position. Another opening 417 is formed in the retaining ring 233 and is located therein exactly opposite the opening 416 for receiving the locating plunger 412 when the spindle head 26 is indexed 180° from the illustrated position.

When the spindle head 26 has been precisely located in the index position, it is securely clamped to the mounting plate by operation of four clamp mechanisms 445, shown in FIG. 1. The four clamp mechanisms 445 are identical in construction and operation and the description of one of them will apply to all. As shown in FIG. 9, the clamp mechanism 445, comprises a clamp stud 446 having an integrally formed external head 447 that is provided with a lip portion 448. When the stud 446 is moved inwardly, its lip portion 448 is adapted to forcefully engage a machined external circular surface 449 of the spindle head 26, shown in FIGS. 1 and 2, to securely clamp the spindle head in operative position to the mounting plate 221. For operating the clamping stud 446 in a clamping or releasing operation, the lower or inner end 451 of the clamp stud 446 is threadedly engaged in a threaded bore 452 of a gear 453. The gear 453 is provided with a pair of axially extending hubs 454 and 456, the hub 456 being journaled in an opening 457 formed in the mounting plate 221. The opposite hub 454 is journaled in a retaining ring 458 which is disposed and secured in a counterbore 459 and serves to maintain the gear 453 in axially fixed position in a concentric operating recess 461. A piston and cylinder mechanism 460, comprising a piston 462, reciprocally supported in a transverse bore or cylinder 463, is provided with a rack 464 which is in meshing engagement with the gear 453 and is operative to effect rotation of the gear in either direction. Fluid pressure supplied to a chamber 466 will react on the right end of the piston 462 to effect leftward movement of the piston. Leftward movement of the piston will effect clockwise rotation of the gear 453 which, in turn, operates to effect axial inward movement of the clamping stud 446 to clamp the spindle head 26 to the mounting plate 221. On the other hand, fluid pressure supplied to a chamber 467 will react on the left end of the piston 462 to effect rightward movement of the piston, and in turn, counterclockwise rotation of the gear 453, which results in outward movement in the clamping stud 446, thereby releasing the spindle head 26 from clamping engagement with the mounting plate 221.

As previously mentioned, each of the spindles 35 and 36 is adapted to be selectively power driven when positioned in the operating station 74. To this end, a selective dual spindle drive transmission 475 is provided, as shown in FIG. 4, and is carried as a unit in a housing 477 integrally formed with the mounting plate 221 and extending rearwardly therefrom into the hollow column 22. The transmission 475 comprises a power input shaft 478 which is journaled in the transmission housing 447, being rotatably supported at both ends by bearings 481 and 482. The left end of the input shaft extends outwardly of the housing 477 through a transmission housing cover 483 and a bearing retainer plate 484 and receives an input gear 486 which is keyed thereon. Power for driving the input gear 486 of the transmission 475 is derived from a motor 488 detachably secured to the rear wall of the column 22 and being provided with a motor drive shaft 489 that extends inwardly into the hollow column 22 through a suitable opening formed in the rear wall thereof. The motor is adapted to supply power for rotating a gear 490 secured to the motor shaft 489 within the column 22. Power from the motor driving gear 490 is transmitted to an input shaft 491 of a speed change transmission 493 by means of a gear 492 that is secured to the extending end of the shaft 491 and disposed in meshing engagement with the motor gear 490. The shaft 491 is journaled in a speed change transmission 493, which may be of any well-known type that is operable to supply an input drive to the transmission. The transmission gearing (not shown) is operably contained within a transmission case 494 having an integrally formed flanged mounting plate 495 which is adapted to be detachably secured to a suitable mounting surface formed on the outer surface of the column 22 for supporting the transmission in operative position within the hollow column 22. From the speed change transmission 493, power to drive the spindle drive transmission 475 at a selected speed is transmitted by an output shaft 496 carrying a gear 497 disposed in meshing engagement with the input gear 486 of the spindle drive transmission 475.

The transmission 475, previously mentioned, is operably arranged to transmit the power drive at a selected speed to the spindles 35 and 36 selectively. To this end, a driving sleeve 501, having an axial bore, is journaled in coaxial relationship in the sleeve 392 on which the spindle bull gear 390 is supported, being rotatably supported therein by a pair of bearings 502 and at its leftwardly extending end by a bearing 503. The leftwardly extending end of the sleeve 501 is reduced in diameter and receives a gear 504 which is keyed to the sleeve to establish a driving connection therebetween. A power drive from the input shaft 478 to the sleeve gear 504 is established through an idler gear 506 rotatably supported between the front wall of the transmission housing 477 and a depending internal web 507 of the housing, being disposed in meshing engagement with the sleeve gear 504 and a power gear 508. The power gear 508 is carried on the right end of the input shaft 478, being rotatably supported thereon by a bearing 509. The arrangement is such that the input shaft 478 will rotate relative to the power gear 508. To effect a selective driving connection between the input shaft 478 and the power gear 508, a multiple disk electro-magnetic clutch 511 is provided. Energization of the clutch 511 operates to establish a driving connection between the input shaft 478 and the power gear 508. On the other hand, deenergization of the clutch 511 operates to interrupt the power train to the gear 508.

The selective drive to the driving sleeve 501 is transmitted to the spindle 36 by means of a bevel gear 515 integrally formed on the rightward extending end of the sleeve 501, being disposed in the compartment 238 of the spindle head 26 in meshing engagement with a bevel gear 516 integrally formed on the inner end of the shaft 327 to which the power transfer gear 326 is secured. Thus, the spindle 36 may be selectively driven from the input shaft 478 of the transmission, through the energized clutch 511, the intermeshed gears 508, 506 and 504, the sleeve 501, the intermeshed bevel gears 515 and 516, the shaft 327, and the intermeshing gear 326 and spindle gear 324.

A selectively connectible drive is likewise provided for the spindle 35. The drive for the spindle 35 comprises a relatively long drive shaft 521 which extends freely through the bore of the drive sleeve 501 into the compartment 238 of the spindle head 26. The rightwardly extending end of the shaft 521, as viewed in FIG. 4, is journaled in the web 343, being rotatably supported by a bearing 522. The shaft 521 drivingly carries the bevel gear 242, as previously mentioned. A bearing 523, disposed in a counterbore, formed in the rightward end of the sleeve 501, rotatably supports the shaft 521 in spaced concentric relationship relative to the wall of the bore of the sleeve 501. The shaft 521 extends leftwardly into the housing 477 with the extreme leftward end of the shaft being rotatably supported in a bearing 524 carried in a suitable opening formed in the bearing retainer plate 483. A gear 526, having an elongated axial rightwardly extending hub is spline connected to the splined leftward end of the shaft 521, the hub being journaled by a pair of bearings 528 in a transverse web 527 integrally formed in the housing 477. Power from the transmission input shaft 478 is selectively transmitted to the gear 526 by operation of another multiple disk electro-magnetic clutch 531 which is similar to the clutch 511. A driven member 532 of the clutch 531 is provided with a plurality of clutch plates and is secured to the rightwardly extended hub of a power gear 533. An antifriction bearing 534 is mounted on the left end of the shaft 478 and rotatably supports the power gear 533, so that the shaft 478 and the power gear 533 are independently rotatable relative to each other. A driving member 535 of the clutch 531 is mounted on and keyed to the input shaft 478 to rotate with the shaft and operates upon energization of the clutch 531 to couple the driving member 535 and the driven member 532 together to establish a drive connection between the input shaft 478 and the power gear 533. Thus, upon the selective energization of the clutch 531, a drive to the spindle 35 is established from the input shaft 478, through the clutch 531, the power gear 533, the gear 526, shaft 521, and the intermeshing bevel gears 424 and 421.

Selective energization of the spindle clutches 511 or 531 for effecting selective operation of the spindles 36 and 35, respectively, is accomplished by actuating one or the other of a pair of limit switches 538 or 539, respectively, associated with clutches 511 and 531. The limit switches 538 and 539 are carried by the bracket 403, being spaced apart thereon for individual actuation. In FIG. 20, the plunger of the limit switch 539 is shown actuated by a dog 541 carried by the dog bracket 411. The dog 541 is located in a position to actuate the limit switch 539 when the spindle 35 is in the operating station 74. Energization of the limit switch 539 causes energization of the clutch 531 to render the spindle 35 operative for performing a work operation. On the other hand, when the spindle 36 is located in the operating station 74, the bracket 405, which is mounted in the circular T-slot 397 diametrically opposite the bracket 411, will move with the spindle head 26 so that a dog 544, carried by the bracket 405 is positioned to engage the plunger of the limit switch 538 for actuating the switch. Actuation of the limit switch 538 effects energization of the magnetic clutch 511 to render the spindle 36 operative for performing a work operation.

However, before either the spindle 35 or the spindle 36 can be operated to perform a work operation, the spindle head 26 must be accurately located in the index position and clamped. To this end, the limit switches 538 and 539, which are associated with the spindle clutches 532 and 511, respectively, are connected in the electrical control system, so as to be dependent upon the prior operation of an index plunger "IN" limit switch 550 that is associated with the index locating plunger 412. As shown in FIG. 4, the index plunger "IN" limit switch 550 is carried in a case 551 which is secured to the bottom surface of the mounting plate 221 in a position directly below the index plunger mechanism.

Actuation of the limit switch 550 is effected by the leftward movement of its associated plunger 552, the end of which is disposed to engage the peripheral surface of an actuating rod 553. The actuating rod 553 is slidably supported within a transverse bore formed in the cylinder end cap 415, being urged towards the index locating plunger 412 by a spring 554. The end of the actuating rod 553 adjacent the index locating plunger 412 is disposed to engage a groove 555 formed in the peripheral surface of the index locating plunger 412. However, the groove 555 of the index plunger 412 is positioned to receive the end of the actuating rod 553 only when the index plunger 412 has been moved into full registry with one of the openings 416 or 417 of the spindle head 26. With the actuating rod 553 engaged in the groove 555 of the index plunger 412, a notch 556 formed in the rod 553 is positioned to receive the end of the outwardly biased switch plunger 552 so that the plunger 552 is released and the limit switch 550 deactuated, indicating in the electrical control circuit that the spindle head 26 is accurately positioned. On the other hand, when the locating index plunger 421 is retracted from the openings 416 or 417 of the spindle head 26, the actuating rod 553 will be forced inwardly within its associated bore against the force of the spring 554. With the actuating rod 553 moved inwardly within its bore, the groove 556 of the actuating rod will be moved out of switch plunger alignment and the switch plunger will be forced inwardly towards the limit switch 550, to actuate the limit switch and indicate in the electrical control circuit that the spindle head is not positioned or clamped. Thus, with the limit switches 538 and 539 both connected in the electrical control circuit so as to be dependent upon the deactuation of the limit switch 550, neither the spindle 35 nor the spindle 36 can be rendered operable to perform a work operation until the spindle head 26 is accurately located in an index position.

The limit switch 550 is also operable when actuated to indicate in the control circuit that the tool change mechanism 24 is to be operated in a tool change operation. To this end, actuation of the limit switch 550 will operate to energize a solenoid valve for the purpose of directing fluid pressure to the tool change mechanism actuator 93 for advancing the magazine 25 in a tool change operation.

The hydraulic circuit for driving the various components described above is illustrated diagrammatically in FIG. 22 and comprises a pump 556 connected to draw hydraulic fluid from the reservoir 557 for providing fluid pressure to a main pressure supply line 558. A pressure regulating valve 559 is interconnected between the pump 556 and a reservoir return line 549, in a well-known manner, so that the hydraulic fluid supplied to the supply line 558 is under uniform pressure with excess fluid being returned to the reservoir 557 via the return line 549.

Operation of the piston and cylinder mechanism 418 for moving the indexing locating plunger 412 out of spindle head engagement prior to the indexing of the spindle head 26, is under the control of a directional valve 561. This valve is a two position valve selectively actuatable to connect one or the other of the ends of the cylinder 414 to the pressure line 558 and to a reservoir return line 562. For effecting the withdrawal of the index locating plunger 412 out of spindle head engagement, the valve 561 may be actuated by energizing a solenoid coil 563 to position the valve to connect the right end of the cylinder 414, as viewed in FIG. 22, to the pressure line 558. A pressure regulating valve 564 is interconnected between the main pressure line 558 and the directional valve 561 so that the fluid entering the valve will be at a lower pressure than that supplied by the pump 556. With the valve 561 positioned as described, the fluid pressure supplied from the pressure line 558 will be directed into a line 565 that is connected to the right end of the cylinder 414 to move the piston 413 in a leftward direction for retracting the index locating plunger 412. On the other hand, energization of the solenoid coil 566 will actuate the valve 561 to connect the opposite end of the cylinder 414 to the pressure line 558. The fluid will flow through the valve 561 and will be directed into a line 567 connected to the left end of the cylinder 414 to move the associated piston 413 in a rightward direction to extend the index locating plunger 412 into registry in either the opening 416 or 417 in the spindle head 26. A throttle valve 568 is connected in a return line 569 that carries exhaust pressure from the piston and cylinder mechanism 418 to the reservoir return line 562 so that the rate of extension of the index locating plunger 412 may be regulated.

The hydraulic pressure in the line 567 for moving the index locating plunger 412 into registry with either the opening 416 or 417 of the spindle head 26 also flows into a branch line 570. However, a sequence valve 571 connected in the branch line 570 blocks the further flow of fluid until such time as the piston 413 has moved in a rightward direction its full limit of travel. When this occurs, the pressure in the branch line 570 will build up and the sequence valve 571 will open to permit the flow of fluid at a higher pressure into a line 572 and thence to the chamber 466 at the right end of the cylinder 463. The fluid pressure supplied to the chamber 466 will effect the movement of the piston 462 in a leftward direction to operate the clamp 447 in a spindle head clamping action. It is to be noted that while only one clamp mechanism 445 is shown diagrammatically in FIG. 22, it is representative of all four of the clamp mechanisms utilized for rigidly clamping the spindle head 26 in an indexed position to the mounting plate 221, and the other three clamp mechanisms would be hydraulically connected in parallel relationship. The exhaust pressure from the chamber 467 at the left end of the cylinder 463 will flow through a line 573 and a check valve 574 into a branch line 575 that is connected to the line 565 and return to the reservoir 576, as previously described.

On the other hand, when the valve 561 is actuated to direct fluid pressure into the line 565 for effecting the wtihdrawal of the index locating plunger 412, the fluid will also flow into the branch line 575. However, a sequence valve 576 connected in the line effectively blocks the further flow of the fluid pressure until such time as the piston 413 has been moved in a leftward direction its full limit of travel for completely withdrawing the plunger 412. When the piston 413 is in full leftward position, the pressure in the branch line 575 will build up to a predetermined value and the sequence valve 576 will open. Thereupon the fluid pressure will flow through the valve 576 and into the chamber 467 at the left end of the cylinder 463 to move the piston 462 in a rightward direction to operate the clamp mechanism 445 in an unclamping action. The exhaust pressure from the chamber 466 will flow into the line 572 and through a check valve 577 and thence into the branch line 570 which is connected to the line 567, and return to the reservoir 557.

The axial locking and the clamping of a tool in one spindle and the simultaneous releasing of a tool in the opposite spindle is effected by means of the piston 353 that is axially movable within the cylinder 354, as previously described. It will be assumed that the spindle head 26, as depicted diagrammatically in FIG. 22, is being moved in an indexing movement in a clockwise direction of rotation so that the spindle 36, with a tool in a released condition therein, is moved out of the tool change station 75, and the spindle 35, with a tool axially locked and clamped therein, is moved out of the operating station 74. The piston and cylinder mechanism 350 for simultaneously clamping and releasing the tools carried in the spindles 35 and 36 is under the control of a directional valve 581 which normally prevents the flow of fluid pressure to and from the cylinder 354, as shown in FIG. 22. The valve 581 may be actuated in one or the other of two flow directing positions by energizing a solenoid coil 582 or a solenoid coil 583. Since the spindle 36, with a tool in a released condition therein, is being moved out of the tool change station 75, the solenoid coil 582 will be energized to actuate the valve 581 to position the valve to connect the chamber 394 at the right end of the cylinder 354, as viewed in FIG. 22, to the pressure line 558 to move the piston 353 toward the left end of the cylinder 354. Such movement of the piston 353 toward the left end of the cylinder 354 operates to rotate the cam member 340 180° relative to the inner ends of the spindles 35 and 36, as previously described. The 180° rotation of the cam member 340 operates to release the drawbars 332 and 333 associated with the spindle 36, to effect axial locking and collet clamping of the tool carried in the spindle 36. The 180° rotation of the cam member 340 also operates to position the cam member in engagement with the inner ends of the drawbars 287 and 308 associated with the spindle 35, to move these drawbars axially outwardly so that the tool carried in the spindle 35 will be released for subsequent withdrawal from the spindle. On the other hand, in a second cycle of operation, the spindle 35, with a tool carried thereby in a released condition, will be moved from the tool change station 75 to the operating station 74 while the spindle 36, with a tool axially locked and clamped therein, will be moved out of the operating station 74 and into the tool change station 75. In this cycle of operation, the solenoid coil 583 is energized to actuate the valve for connecting the chamber 409 at the left end of the cylinder 354 to the pressure line 558 to move the piston 353 in a rightward direction, as viewed in FIG. 22. The movement of the piston 353 toward the right end of the cylinder 354 operates to again rotate the cam member 340 180° relative to the inner ends of the spindles 35 and 36. However, the 180° of rotation of the cam member 340 moves the cam member so as to release the drawbars 287 and 308 associated with the spindle 35 to effect the axial locking and collet clamping of the tool carried by the spindle, while positioning the cam member in engagement with the inner ends of the drawbars 332 and 333 associated with the spindle 36 to move these drawbars axially outwardly for effecting a complete release of the tool carried by the spindle 36. A throttle valve 586 is connected in a return line 587 the carries exhaust pressure from the piston and cylinder mechanism 350 to a return line 588 so that the rate of rotation of the cam member 340 may be regulated.

Operation of the fluid actuator 93 for advancing the tool change slide 90 into the tool change station 75 to position an empty storage socket 65 in engagement with a tool presented by one or the other of the spindles 35 and 36 is under the control of a two position direction valve 590. For advancing the tool change slide 90, the valve 590 may be actuated by energizing a solenoid coil 591 to position the valve to connect the left end of the cylinder 94, as viewed in FIG. 22, to the main pressure line 558. With the left end of the cylinder 94 connected to the pressure line, the piston 96 is moved in a rightward direction for advancing the slide 90 and the associated magazine 25, into the tool change station 75. On the other hand, the valve 590 may be actuated by energizing a solenoid coil 592 to position the valve to connect the pressure line 558 to the right end of the cylinder 94 to move the piston in a leftward direction for retracting the slide 90 out of the tool change station 75. A throttle valve 593 is connected to a return line 594 that carries exhaust pressure from the piston and cylinder mechanism 93 to the reservoir return line 562 so that the rate of slide advancement and retraction may be regulated.

The piston and cylinder mechanism 130 for elevating and retracting the magazine 25 is under the control of a two position directional valve 597. The valve 597 may be actuated by energizing a solenoid coil 598 to position the valve to connect the line 133, which is connected to the chamber 135 at lower end of the cylinder 129, to the pressure line 558. With the valve 597 positioned in the above described manner, the fluid pressure to the chamber 135 will effect upward movement of the piston 131 to elevate the magazine 25 for withdrawing the tool coupled therewith out of the spindle that is in the tool change station 75. On the other hand, energization of a solenoid coil 599 will actuate the valve 591 to connect the line 137 that is connected to the chamber 136 at the upper end of the cylinder 129, with the pressure line 558. The fluid pressure supplied to the chamber 136 of the cylinder 129 will operate to move the piston 131 in a downward direction to lower the magazine 25 for inserting a tool into the spindle in the tool change station 75. A throttle valve 601 is connected to a return line 602 that carries exhaust pressure from the piston and cylinder mechanism 130 to the reservoir return line 562 so that the rate of vertical movement of the magazine 25 may be regulated.

The electrical control circuit for controlling the operation of the machine is shown in the wiring diagram illustrated in FIG. 23. In the drawing, the relay contact bars are shown in their normal positions and are connected to their cooperating coils by a broken line to indicate that they are actuated from their normal position upon energization of their associated coil. Also, the contact bars of the various limit switches are shown in positions representative of the static condition of the machine prior to a tool change cycle of operation. Each of the electrical components is shown in the wiring diagram as connected across a pair of power lines P1 and P2 in one of a plurality of conductors or lines that are connected across the power lines with each of these lines being identified successively by the reference numbers 1 to 38 inclusive, so that the components may be readily located in the diagram.

Power for operating the machine is obtained from a source of three phase current represented by the lines L1, L2 and L3, which are connected to energize the spindle head index drive motor 380, the magazine index drive motor 162, the hydraulic pump motor 610, and the reversible spindle drive motor 488, through the normally open contact bars of relays 612, 613 and 614 respectively associated with the motors 380, 162 and 610, and the contact bars of a pair of rotational direction relays 616 and 617, associated with the spindle drive motor 488. The selective operation of the forward rotational direction relay 616 and the reverse rotational direction relay 617 is controlled by a direction selector switch 618 shown located between lines 5 and 6. For the purpose of this description, it will be assumed that the spindle drive motor 488 is to be operated for forward rotation, therefore, the button 619 of the selector switch 618 will be positioned to move a contact bar 620 of the switch into closed position, as shown in line 5. The control circuit illustrated is energized by single phase current obtained from a transformer 625 which has its primary coil connected to the lines L2 and L3 with its secondary coil being connected to supply power to the power lines P1 and P2 of the control circuit.

The control circuit for the spindle drive motor 488 and the pump motor 610 may be energized by closing a push button switch 626 to complete a circuit from the energized power line P1 along line 2 through the normally closed contact bar 621 of a push button stop switch 622 and the closed contact bar 627 of the push button start switch 626 to a coil 628 of the pump motor starter 614. From the coil 628 the circuit continues to the power line P2 that is connected to the opposite side of the secondary coil of the transformer 625 to complete the circuit. Energization of the coil 628 of the starter 614 actuates the starter so that its normally open contact bars 603, 604 and 605 are moved to closed positions to energize the pump motor 610 to effect its operation to drive the hydraulic pump 556. The actuated starter 614 also operates to close another normally open contact bar 624, shown in line 3, for establishing a maintaining circuit around the start button switch 626 from the energized line 2 via a conductor 629, the closed contact bar 624 of the starter and thence to line 2 to maintain the coil 628 of the starter 614 energized after the push button switch 626 has been released. Thus, the hydraulic pump 556 is constantly driven to maintain the hydraulic circuit pressurized whenever the machine is operating.

The motor 488 for selectively driving the spindles 35 and 36 may be energized by closing a push button switch 630, in line 3, to complete a circuit from the energized power line P1 along line 3, through a closed contact bar 631 of the switch 630 and thence to a vertical conductor 632. The circuit continues from the vertical conductor 632 along line 5 through a normally closed contact bar 633 of a push button stop switch 634 and through the closed contact bar 620 of the directional selector switch 618 to a coil 635 of the forward rotational direction motor starter 616. From the coil 635, the circuit continues to the power line P2 which is connected to the opposite side of the secondary coil of the transformer 625. Energization of the coil 635 of the starter 616 will actuate the starter to close its contact bars 636, 637 and 638 to complete the circuit for energizing the spindle drive motor 488 for forward rotation of the spindle. Actuation of the starter 616 will also serve to move another normally open contact bar 639, in line 7, to a closed position to complete a holding circuit around the start push button switch 630 for maintaining the coil 635 of the starter 616 energized. The maintaining circuit is established from the energized power line P1 along line 7 through the closed contact bar 639 to line 8 and thence to the vertical conductor 632. The maintaining circuit continues from the vertical conductor 632 along line 5 through the closed contact bar 633 of the push button stop switch 634 and the closed contact bar 620 of the directional selector switch 618 to the coil 635 of the starter 616 and thence to the power line P2. In this manner, the spindle drive motor 488 is maintained energized at all times to drive either the spindle 35 or the spindle 36, depending upon the selective energization of one or the other of the electromagnetic clutches 531 or 511, respectively.

A description of the electrical control circuit for operating the various components of the machine in a tool change cycle of operation will be given in conjunction with an assumed static condition of the machine in which the spindle head 26 is in the position illustrated in FIG. 4. Thus, the spindle 36 will be in the tool change station 75 and the tool 52 therein is the required tool for the next work operation to be performed and is carried by the spindle in a released condition. On the other hand, the spindle 35 is in the operating station 74 and the tool carried thereby is locked and clamped therein. With the spindle head 26 positioned as described, the limit switch 402, shown in line 15, will be actuated so that its contact bar 641 is in a closed position. Prior to a tool change cycle of operation, the index locating plunger 412 is in engagement with the index locating opening 416, as shown in FIG. 4, so that the limit switch 550 is deactuated. As a result, a contact bar 642 of the limit switch 550, shown in line 17 of FIG. 23, is in an open position, while a pair of contact bars 643 and 644, shown in lines 33 and 37, respectively, are in closed positions. On the other hand, with the spindle 35 in the operating station 74, the limit switch 539 will be actuated so that its contact bar 646, shown in line 37, is in a closed position. With the limit switch 539 actuated and the limit switch 550 deactuated so that its contact bar 644, line 37, is in a closed position, a circuit will be established to energize a coil 649 of the electromagnetic clutch 532. Thus, the spindle drive motor 488 is operatively connected to the spindle 35 and it will be rotating.

Furthermore, the magazine 25 is in its lowermost position so that the limit switch 141, shown in line 18, is deactuated and the limit switch 140, in line 25, is actuated and its contact bar 647 is in a closed position. The slide 90 of the tool change mechanism 24 is in a ready or retracted position so that the limit switch 108, shown in line 34, is deactuated and the limit switch 107, shown in line 29, is actuated.

With the various operating components of the machine in the above described positions, a tool change cycle may be initiated by actuating a tool change cycle push button start switch 650 to move its contact bar 651, in line 11, to a closed position. Upon actuation of the tool change push button start switch 650, the various steps in a tool changing cycle of operation will occur automatically. The now closed contact bar 651 of the push button start switch 650 operates to complete a circuit from the energized power line P1 along line 11 through the closed contact bar 651 of the switch 650 and through a normally closed contact bar 652 of a circuit reset relay 653. The flow of current continues from the normally closed contact bar 652 through a coil 656 of a tool change circuit maintaining relay 657 and thence to the power line P2 to complete the circuit. Energization of the coil 656 of the relay 657 will cause the relay to operate to move a contact bar 658, shown in line 13, to a closed position for establishing a holding circuit around the push button start switch 650. Current will flow from the energized power line P1 along line 13, through the closed contact bar 658 and along line 14 to a vertical conductor 660, to energize the conductor which is maintained energized for an entire cycle of tool change operation. Current will also flow from line 11 to a connected line 12 and through a coil 661 of a timer relay 662 to the power line P2 to complete a circuit for energizing the coil 661. With the coil 661 energized, the relay will operate to release a normal open contact bar 663, shown in line 15, which, after a time delay, will be moved to a closed position for a purpose to be subsequently described.

The first step in a tool change cycle of operation is to effect the withdrawal of the index locating plunger 412 and to unclamp the spindle head 26. Such action is accomplished by actuating the valve 561 so that it is positioned to direct fluid pressure to the right end of the cylinder 414, as viewed in FIG. 22, and this is accomplished by energizing the solenoid coil 563 of the valve. To this end, current will flow from the energized vertical conductor 660 along line 16, through a normally closed contact bar 666 of a relay 667, through a coil 668 of a relay 669 and thence to the power line P2 to complete the circuit. With the coil 668 of the relay 669 energized, the relay will operate to move its normally closed contact bar 671, shown in line 32, to an open position thereby interrupting the circuit along line 32 to effect the deenergization of the solenoid coil 566 associated with the valve 561. The relay 669 will also operate to move its normally open contact bar 672, shown in line 31, to a closed position to establish a circuit for effecting energization of the solenoid coil 563 associated with the valve 561. Thus, current will flow from the energized vertical conductor 660 along line 31, through the now closed contact 672 to the solenoid coil 563 and thence to the power line P2 to energize the solenoid coil 563. With the solenoid coil 566 of the valve 561 deenergized and the solenoid coil 563 energized, the valve 561 will be actuated to direct fluid pressure to the right end of the cylinder 414 of the piston and cylinder mechanism 560 for effecting retraction of the index locating plunger 412 out of spindle head engagement. When the index locating plunger has been completely retracted, the fluid pressure will sequence to release the clamp mechanisms 445, as previously described.

In a retracted position, the index locating plunger 412 will actuate the limit switch 550 to move its associated contact bars 643 and 644, in lines 33 and 37, respectively, to open positions. With the contact bar 643, in line 33, of the limit switch 550 in an open position, the circuit to the solenoid coil 591 is interrupted so that the slide 90 of the tool change mechanism 24 cannot be advanced. The movement of the contact bar 644, in line 37, to an open position, serves to interrupt the circuit along line 37, and thereby effect the deenergization of the coil 649 of the electromagnetic clutch 532 to stop rotation of the spindle 35 before an indexing movement of the spindle head 26 occurs.

The indexing movement of the spindle head 26 is initiated through the contact bar 642, in line 17, of the limit switch 550, which has now been moved to a closed position. Thus, current will flow from the energized vertical conductor 660 along line 17, through the now closed contact bar 642 and a normally closed contact bar 673 of the relay 667, to a coil 674 of the spindle head index motor starter 612. The current flows from the coil 674 along the line 17 to the power line P2 to complete the circuit. With the coil 674 of the starter energized, it will operate to move three normally open contact bars 676, 677 and 678 to closed position, thereby completing a circuit from the three phase source of power, represented by the lines L1, L2 and L3, to the spindle head index motor 380 to effect its operation for moving the spindle head 26 in an indexing movement.

When the spindle head 26 starts to move in an indexing movement, the limit switch 402, shown in line 15, will be deactuated so that its contact bar 641 is moved to an open position. After the limit switch 402 has been deactuated, the time-to-close contact bar 663 of the timer relay 662 will be moved to a closed position through the operation, in a well-known manner, of the timer mechanism (not shown) associated with the contact bar. The opening of the contact bar 641 of the limit switch 402 and the closing of the time-to-close contact bar 663 of the timer relay 62 conditions these electrical elements for a subsequent operation of effecting the deenergization of the spindle head index motor 380, which will be described later.

When the spindle head 26 has been rotated substantially 90° from the position shown in FIG. 1, the limit switch 399 will be actuated by the dog 395 to move its contact bar 676, in line 35, to a closed position and simultaneously moving its associated contact bar 677, in line 36, to an open position. With the contact bar 676 moved to a closed position, a circuit will be completed and current will flow from the energized power line P1 along line 35, through a normally closed contact bar 678 of the deactuated limit switch 406 and through the closed contact bar 676 of the actuated limit switch 399. The current will flow from the closed contact bar 676 along line 35, to the solenoid coil 582 of the valve 581 and thence to the power line P1 to complete the circuit for energizing the solenoid coil 582. With the solenoid coil 582 energized, the valve 581 will be actuated to position the valve for directing fluid pressure to the chamber 391 at the right end of the cylinder 354, as viewed in FIG. 22, to operate the cam member actuating mechanism 350 for rotating the cam member 340 180° relative to the inner ends of the spindles 36 and 35, as previously described. This operation actuates the drawbars 332 and 333 associated with the spindle 36 to axially lock and clamp the tool carried by the spindle 36. In addition, the drawbars 287 and 308 associated with the spindle 35 are operated to release the tool carried by the spindle 35, as previously described. The dog 395, shown in FIG. 4, which is positioned to actuate the limit switch 399 is arranged to maintain the limit switch 399 actuated, as the spindle head 26 continues to be rotated, until the piston 353 of the actuator 350 has moved its full limit of leftward travel, as viewed in FIG. 22.

As the spindle head 26 continues to move in its indexing movement, the dog 395 will be moved out of engagement with the plunger of the limit switch 399 thereby deactuating the limit switch and its contact bar 676 in line 35 is moved to an open position and its associated contact bar 677, in line 36, is moved to a closed position, as shown in FIG. 23. Moving the contact bar 676 to open position results in the circuit to the solenoid coil 582 of the valve 581 being interrupted to deenergize the coil. Thereupon, the valve is actuated to a position to block the flow of fluid pressure to the cam member actuator 350 and also to block the flow of exhaust pressure therefrom.

In the second cycle of tool change operation, the initial position of the spindle head 26 would be such that the spindle 35, with a tool therein in a released condition, is in the tool change station 75 and is to be moved to the operating station; while the spindle 36, with a tool locked therein, is in the operating station 74 and is to be positioned in the tool change station. Under these conditions, the operation of the electrical system previously described for the first cycle of a tool change operation will be the same. However, in the second cycle of tool change operation, when the spindle head 26 has been moved substantially 90° from the initial vertical position, the dog 407, shown in FIG. 4, will be moved into position to engage the plunger of the limit switch 406 to actuate the switch. The limit switch 406, upon being actuated, will move its associated normally closed contact bar 678, in line 35, to an open position to insure that the solenoid coil 582 cannot be inadvertently energized. Simultaneously, with the movement of the contact bar 678 to an open position, an associated normally open contact bar 679, in line 36, of the limit switch 406 is moved to a closed position. With the contact bar 679, in line 36, moved to a closed position, a circuit will be completed and current will flow from the power line P1 along line 36 and through the closed contact bar 679 of the actuated limit switch 406 and through the normally closed contact bar 677 of the deactuated limit switch 399. From the contact bar 677, current will flow along line 36 and through the solenoid coil 583 of the valve 581 to the power line P2 to complete the circuit to energize the coil 583. With the solenoid coil 583 energized, the valve 581 will be actuated to a position to direct fluid pressure to the chamber 409 of the cam member actuator 350 for rotating the cam member 340 180° relative to the inner ends of the spindles 35 and 36. In this second cycle operation of the cam member 340, it will operate to effect the operation of the drawbars 287 and 308 associated with the spindle 35 to axially lock and clamp the tool carried therein in the spindle. The rotation of the cam member 340 in the second cycle of operation will also effect the operation of the drawbars 332 and 333 associated with the spindle 36 for releasing the tool carried by the spindle 36, as previously described. The dog 407 which actuates the limit switch 406 is arranged to maintain the limit switch 406 actuated for an interval of time sufficient to insure that the piston 353 of the actuator is moved its full limit of travel in the opposite direction. As the spindle head 26 continues to move in its second cycle of indexing movement, the dog 407 will be moved out of engagement with the plunger of the limit switch 406 and the limit switch will be released and deactuated. Upon deactuation of the limit switch 406, its contact bar 679, in line 36, is moved to its normally open position to interrupt the circuit to the solenoid coil 583 to deenergize the coil. With the solenoid coil 583 deenergized, the valve 581 is actuated to a position to block the flow of fluid pressure to the cam member actuator 350 and also to block the flow of exhaust pressure from the actuator 350.

Returning now to a further description of the electrical control system for effecting an automatic tool change in a first cycle of operation, when the spindle head 26 has been rotated in an index movement of 180° wherein the spindle 36, with a tool locked therein, is located in the operating station 74 and the spindle 35, with a tool released therein, is positioned in the tool change station 75, the bracket 405 mounted on the peripheral surface of the spindle collar 398, as shown in FIG 1, will be moved into a position adjacent to the bracket 403. In this position of the bracket 405, the dog 404 will be in engagement with the plunger of the limit switch 402 to actuate the switch, thereby moving its contact bar 641, shown in line 15, to a closed position. The coil 661, in line 12, of the relay 662 has been previously energized, as described, so that its associated normally open contact bar 663, in line 15, moved to a closed position after a time delay. Therefore, when the contact bar 641 of the limit switch 402 is moved to a closed position, a circuit will be established so that current will flow from the energized vertical conductor 660 along line 15, through the closed contact bar 641 and the closed contact bar 663 to a coil 681 of the relay 667. The current will flow from the coil 681 along line 15, to the power line P2, to complete a circuit to energize the coil 681. With the coil 681 of the relay 667 energized, the relay will operate to move its normally closed contact bar 673, in line 17, to an open position for interrupting the circuit to the coil 674 thereby deactuating the spindle head motor starter 612 to deenergize the motor 380 and stop spindle head movement with the spindles 35 and 36 being located in the tool change station 75 and the operating station 74, respectively. Also, the normally closed contact bar 666, in line 16, of the relay 667 is moved to an open position for interrupting the circuit to the coil 668 of the relay 669 to deenergize the coil. With the coil 668 deenergized, the relay 669 will operate to move its associated contact bar 672, in line 31, to its normally open position, which serves to deenergize the solenoid coil 563 of the valve 561. Also, the opened normally closed contact bar 671, in line 32, of the relay 669 is moved to its normally closed position to establish a circuit along line 32. Thus, current will flow from the energized vertical conductor 660 along line 32 and through the closed contact bar 671 of the deenergized relay 669. From the contact bar 671 current will continue to flow along line 32 and through the solenoid coil 566 to the power line P2 to complete the circuit and energize the solenoid coil 566. With the solenoid coil 566 of the valve 561 energized, the valve will be actuated to position the valve to direct fluid pressure to the left end of the cylinder 414 of the index locating plunger actuator 418 to effect movement of the piston 413 in a rightward direction, as viewed in FIGS. 4 and 22. The rightward movement of the piston 413 in the cylinder 414 will move the index locating plunger 412 into engagement with the opening 417 that is now located in a position that is 180° displaced from the position shown in FIG 4. This action positively locates the spindle head 26 in an exact desired vertical index position and the spindle 36 will be in position for a work operation while the spindle 35 will be positioned in the tool change station 75 in condition to have a tool change effected. When the index locating plunger 412 has been moved in a rightward direction its full limit of travel, the fluid pressure will sequence to the four clamp mechanisms 445 to actuate them in a clamping action, as previously described.

The rightward movement of the index locating plunger 412 into locating engagement with the spindle head 26 will release the limit switch 550 to deactuate the switch. As a result, its contact bar 642, in line 17, will be moved to its normally open or initial position. Also, the two normally closed contact bars 643 and 644, in lines 33 and 37, respectively, of the limit switch 550 are moved to their closed positions.

It will be recalled that as the spindle head 26 was rotated in 180° of index movement, the bracket 405, which is located on the peripheral surface of the collar 398 and to the righthand side of the spindle head 26, as viewed in FIG. 1, will move with the spindle head. Therefore, when the spindle head 26 has been moved its full 180° of index movement, the bracket 405, moving with the spindle head, will move through an arc of 180° and will be located in a position adjacent to the limit switches carried on the bracket 403. In this position, the dog 544 carried by the bracket 405 will engage the plunger of the limit switch 538 to actuate the switch for moving a switch contact bar 686, shown in line 38 of FIG 23, to a closed position. With the contact bar 644 of the limit switch 550 moved to a closed position and the contact bar 686 of the limit switch 538 in a closed position, a circuit will be completed and current will flow from the power line P1 along line 37 and through the closed contact bar 644. From the contact bar 644, current will continue to flow along line 37 to the connected branch line 38 and thence through the closed contact bar 686 of the limit switch 538 to a coil 688 of the clutch 511 that is associated with the spindle 36. From the coil 688, the current will flow to the power line P2 to complete the circuit energizing the clutch coil 688 which operates the clutch 511 to establish a drive connection from spindle drive motor 488 to the spindle 36 for effecting rotation of the spindle at a selected speed as established through the operation of the speed change transmission 493. Thus, when the spindle head 26 has been accurately located and clamped in the index position, the spindle 36 in the operating station 74 is automatically connected to be driven by the spindle drive motor 488 for performing a work operation. On the other hand, if the cycle of index movement was such as to move the spindle 35 and an associated tool carried therein, into the operating station, the limit switch 539 would have been actuated by means of the dog 541 carried on the bracket 411. In this case, the contact bar 646 of the limit switch 539 would be moved to a closed position and current would flow from the closed contact bar 644, in line 37, along line 37 through the closed contact bar 646 of the limit switch 539 and through the coil 649 of the electromagnetic clutch 531 associated with the spindle 35, and thence to the power line P2 to complete the circuit. Thus, the clutch 531 would be operated to connect the spindle drive motor 488 to the spindle 35 for effecting rotation of the spindle 35 at a selected speed as established through the speed change transmission 493. In either case, the selective power drive to the spindle in the operating station 74 is automatically accomplished and that particular spindle is rendered operative to perform a work operation.

As previously mentioned, the deactuation of the limit switch 550 will move its associated contact bar 643, in line 33, to a closed position. Since the coil 681 of the relay 667 has been previously energized, the relay will have operated to move an associated normally open contact bar 689, in line 33, to a closed position. Thus, current will flow from the energized vertical conductor 660 along line 33 and through the closed contact bars 643 and 689, and a normally closed contact bar 691 of a relay 692 to the solenoid coil 591 of the valve 590. The current will flow through the coil 591 and to the power line P2 to complete the circuit to energize the solenoid coil 591. At this time, the solenoid coil 592 associated with the valve 590 is deenergized, therefore, when the solenoid coil 591 is energized, the valve will be actuated to position the valve so that it directs fluid pressure to the left end of the piston and cylinder mechanism 93, as viewed in FIG. 22, to effect movement of the slide 90 in a rightward direction, as viewed in FIGS. 4 and 22. This rightward movement of the slide 90 will move the magazine 25 out of the ready position that it occupies, as shown in FIG. 4, into the tool change station 75, wherein the empty socket 65 presented by the magazine is coupled to the tool 51 presented by the spindle 35 which is now in the tool change station. As the slide 90 advances, the limit switch 107 is released or deactuated and the switch operates to move its associated contact bar 693, shown in line 29 of FIG. 22, to an open position for reasons to be subsequently described.

When the slide 90 has moved in a rightward direction its full limit of travel so that the tool 51 carried by the spindle 35 is coupled to the socket 65 of the magazine 25, the limit switch 108, shown in FIGS. 1 and 6, and schematically in the hydraulic diagram of FIG. 22, will be actuated. As a result, its associated normally open contact bar 694, shown in line 34 of FIG. 23, is moved to a closed position to establish a circuit along line 34. Current will flow from the energized vertical conductor 660 along line 34 and through the closed contact bar 694. From the contact bar 694, the current will continue to flow along the line 34 and through a normally closed contact bar 696 of a relay 697 and through the solenoid coil 598 of the valve 597 and thence to the power line P2, to complete the circuit for energizing the solenoid coil 598. Energization of the solenoid coil 598 will actuate the valve 597 to position the valve for directing fluid pressure to the chamber 135 of the piston and cylinder mechanism 130 to operate the mechanism 130, as previously described, to move the magazine 25 upwardly. The movement of the magazine 25 in an upward direction will operate to withdraw the tool 51 from the spindle 35. As the magazine 25 moves axially in an upward direction, the limit switch 140, shown in FIGS. 1 and 21, and diagrammatically in FIG. 22, is deactuated and will operate to move its contact bar 647, shown in line 25 of FIG. 23, to an open position.

When the magazine 25 is fully elevated, the limit switch 141, shown in FIGS. 1 and 21, and diagrammatically in FIG. 22, will be actuated to move its associated normally open contact bar 698, shown in line 18 of FIG. 23, to a closed position to complete a circuit to the coil 699 of the magazine index motor starter 613. Thus, current will flow from the energized vertical conductor 660 along line 18 and through the closed contact bar 698 of the actuated limit switch 141. From the contact bar 698, the current will flow along line 18 and through a normally closed contact bar 706 of a relay 707 to the coil 699 of the starter relay 613. The current will flow through the coil 699 to the power line P2 to complete the circuit for energizing the starter coil 699. With the starter coil 699 energized, the starter 613 is operated to move three associated normally open contact bars 708, 709 and 710 to closed positions thereby connecting the magazine index motor 162 to the source of three phase current represented by the lines L1, L2 and L3. The current flowing to the motor 162 will effect its operation for moving the magazine 25 in an indexing movement. This will move the tool 51 that has been withdrawn from the spindle 35 out of axial alignment with the spindle and move the tool 53, shown in FIG. 3, into axial alignment with the spindle 35. As soon as the magazine 25 starts to rotate in an indexing movement, the limit switch 187, shown in FIGS. 5 and 8 and schematically in FIG. 22, wil be actuated, as previously described. Actuation of the limit switch 187 will serve to move its associated normally closed contact 712, shown in line 22 of FIG. 23, to an open position.

With the line 18 energized, current will also flow along line 19, which is connected to line 18, and thence along the connected line 20 to a coil 714 of a timer relay 715. The current will flow through the coil 714 to the power line P2 to complete the circuit for energizing the coil 714. With the coil 714 energized, the relay will operate to release its associated normally open time-to-close contact bar 716, shown in line 22 of FIG. 23, which will be moved to a closed position after a predetermined lapse of time sufficient to insure that the contact bar 712 of the limit switch 187 is moved to an open position. This action will pre-condition the circuit along line 22 for subsequently establishing a circuit for energizing coil 717 of the relay 707.

Simultaneously, with current flowing through the coil 714, current will also flow along a connected branch line 21 and through a coil 719 of another timer relay 720. From the coil 719, current will continue to flow to the power line P2 to complete the circuit to energize the coil. With the coil 719 energized, the timer relay 720 will operate to move its associated normally closed time-to-close contact bar 721, shown in line 28 of FIG. 23, to an open position. The relay 720 is a well-known type and operates upon deenergization of its coil to release its associated contact bar 721 which, after a predetermined timed interval, will move to a closed position. With both the timer relay 715 and the timer relay 720 operated, the circuit along line 22 in which the contact bar 716 of the relay 715 is connected, and the circuit along line 28, in which the contact bar 721 of the relay 720 is connected, are preconditioned for subsequent control functions in the subsequent steps in the tool change cycle of operation.

As previously described, the magazine index motor 162 is energized for effecting index movement of the magazine 25. When the magazine has been indexed to position the tool 53 in axial alignment with the spindle 35, the switch 187 will be deactuated by the operation of the stop ring 188 and cooperating plunger 193, shown in FIG. 5, as previously described. The deactuated limit switch 187 will operate to move its associated contact bar 712, in line 22, to its normally closed position. It will be recalled that the contact bar 716 of the timer relay 715 was moved to a closed position after the limit switch 187 had been actuated to move its contact bar 712 to an open position. Therefore, when the contact bar 712 of the now deactuated limit switch 187 is moved to a closed position, a circuit will be completed along line 22. Thus, current will flow from the energized vertical conductor 660 along line 22 through the closed contact bars 712 and 716 and through the coil 717 of the relay 707 to the power line P2 to complete the circuit for energizing the coil 717. With the coil 717 energized, the relay 707 will operate to close its associated normally open contact bar 722 in line 23, to complete a holding circuit along line 24 and through the closed contact bar 722 to line 22 for maintaining the coil 717 of the relay 707 energized upon subsequent deenergization of the coil of the relay 715.

The relay 707 will also operate to move its associated normally closed contact bar 706, in line 18, to an open position thereby interrupting the circuit to the coil of the magazine index motor starter 613, which thereupon operates to disconnect the motor 162 from the lines L1, L2 and L3, stopping motor operation. The relay 707 also operates to move another associated normally open contact bar 723, shown in line 25, to a closed position.

With the contact bar 706, in line 18, moved to an open position, the circuits to the coils 714 and 719 of the timer relays 715 and 720, respectively, are interrupted thereby deenergizing these coils. Thereupon, the contact bar 716, in line 22, of the relay 715 is immediately moved to its normally open position. However, the contact bar 721, in line 28, associated with the relay 720 will remain in open position for a short interval of time to insure that the magazine 25 is properly indexed. After the time interval has expired, the contact bar 721 will move to a closed position, and with the contact bar 723 in line 25 in a closed position, current will flow from the energized vertical conductor 660 along line 25 to the contact bar 723. The current will flow through the closed contact bar 723 and along the connected branch lines 26 and 28, through the now closed contact bar 721. From the contact bar 721, the current will flow along line 28 through a coil 724 of the relay 697 and thence to the power line P2 to complete the circuit and energize the coil 724. With the coil 724 energized, the relay 697 will operate to move its associated normally closed contact bar 696, shown in line 34, to an open position, so that the solenoid coil 598 of the valve 597 cannot be energized, thereby insuring that magazine 25 will not be inadvertently elevated.

The current flowing through the line 28 will also flow through the connected branch line 29 and through the solenoid coil 599 of the valve 597 and thence to the power line P2 to complete the circuit to energize the solenoid coil. With the solenoid coil 599 energized, the valve 597 will be actuated to position the valve to direct fluid pressure to the chamber 136 of the magazine actuator 130. Thereupon, the piston 131 of the actuator will be moved in a downward direction for lowering the magazine 25. As the magazine 25 moves in a downward direction, the limit switch 141, shown in FIGS. 1 and 21, and schematically in FIG. 22, is deactuated. The deactuated limit switch 141 operates to move its associated contact bar 698, shown in line 18 of FIG. 23, to its normally open position and in condition for operation in the succeeding tool change operation.

When the magazine 25 is moved to its lowermost position, it operates to insert the tool 53 into the upwardly facing spindle 35. With the magazine 25 in its lowermost position, the limit switch 140, shown in FIGS. 1 and 21, and schematically in line 25 of FIG. 22, will again be actuated and will operate to move its associated normally open contact bar 647 to a closed position. It will be recalled that the coil 717 of the relay 707 is maintained energized through line 24 and the normally open now closed contact bar 722. Therefore, the associated contact bar 723, in line 25, is in a closed position. Thus, when the limit switch 140 is actuated to move its associated contact bar 647 to a closed position, a circuit will be completed along line 25 to energize a coil 725 of the relay 692. Thereupon, the relay will operate to move its associated normally closed contact bar 691, in line 33, to an open position. This will prevent the solenoid coil 591 of the valve 590 from being energized so that the valve cannot be inadvertently positioned to direct fluid pressure to the left end of the slide actuator 93.

The current in line 25 will also flow along the connected branch line 27 and through the solenoid coil 592 and thence to the power line P2 to complete the circuit to energize the solenoid coil 592. With the solenoid coil 592 energized, the valve 590 will be actuated to position the valve to direct fluid pressure to the right end of the piston and cylinder actuator 93. Fluid pressure supplied to the right end of the actuator 93 will effect its operation to retract the slide 90 and thereby the magazine 25 out of the tool change station 75 into the ready position. As the magazine 25 moves with the slide 90 to the ready position, the magazine will leave the tool 53 in the spindle 35 and retract with the empty socket in ready position for the next tool change cycle of operation. It will be recalled, that with the slide 90 in an advanced rightward position, the dog 109 carried on the side of the slide had been positioned to actuate the limit switch 108. Therefore, as the actuator 93 is operated to retract the slide 90 in a leftward direction, the dog 109 will move with the slide. Thus, when the slide 90 and the associated tool storage magazine 25 have been returned to the ready position, the dog 109 will be positioned to actuate the limit switch 107. The actuated limit switch 107 operates to move its associated contact bar 693, shown in line 29 of FIG. 23, to a closed position to complete a circuit to the coil 654 of the tool change cycle complete relay 653. Current will flow from the line 25, along line 26, to line 29, and thence to the closed contact bar 693 of the limit switch 107. The current will flow through the closed contact bar 693 to line 30 and thence through the coil 654. From the coil 654, current will flow along line 30 to the power line P2 to complete the circuit to energize the coil 654. With the coil 654 energized, the relay 653 will operate to move its associated normally closed contact bar 652, in line 11, to an open position. The movement of the contact bar 652, in line 11, to an open position will interrupt the circuit along line 11 and deenergize the coil 656 of the circuit maintaining relay 657. The relay 657 will thereupon operate to move its associated contact bar 658 to normally open position thereby interrupting the circuit along line 13 to deenergize the vertical conductor 660. With the vertical conductor 660 deenergized, the coils of the various relays, including the coil 654 of the tool change complete relay 653, are all deenergized and the various relays operate to move their associated contact bars to their normal position that they occupy, as shown in FIG. 23. Thus, the electrical control system for controlling the operation of the various operative components is conditioned for the next tool change cycle of operation. However, it should be noted that upon the completion of the tool change cycle of operation, the limit switch 550 is deactuated and its associated contact bar 644, in line 37, is in a closed position. Also, with the spindle head 26 in the index position, in which the spindle 35 is located in the tool change station 75, the limit switch 538, in line 38, is actuated so that its associated contact bar 686 is in a closed position. As a result, the coil 688 of the magnetic clutch 531 is maintained energized so that the spindle drive motor 488 is connected to drive the spindle 36 that is located in the operating station 74. Thus, the spindle 36 is operatively driven to perform a work operation during the tool change operation and also after a tool change has been effected.

The machine tool with a tool storage changer mechanism illustrated in FIGS. 1, 2 and 3, is a vertical spindle machine, but it is especially adapted to be converted into a horizontal spindle type of machine with a tool storage changer mechanism. Such alternate arrangement of the machine is shown in FIG. 24 and the conversion can be accomplished without the addition of any major components other than those already described. The horizontal spindle type machine, shown in FIG. 24, utilizes the same base 20 and pedestal 21 which support the knee 41, saddle 46, and table 50, for movement in three mutually transverse directions. In removing the column 22 that is used in the vertical spindle type machine, an opening 741 formed in the pedestal 21 is exposed. This opening 741 is constructed to receive the mounting plate 221. The components comprising the spindle head 26, mounting plate 221, and the spindle drive transmission 475, can be removed as a unit from the column 22 by removing the bolts 223 which secure the mounting plate 221 to the column 22. This entire unit can be inserted into the top of the pedestal 21, with the mounting plate 221 being inserted in the opening 741. The spindle transmission 475, which is attached to the mounting plate 221, will depend therefrom into the interior of the hollow pedestal 21. Since the spindle head 26 is indexably supported on the mounting plate, it will rotate in an indexing movement about a vertical axis. With this arrangement, as shown in FIG. 24, the spindle 36 is located in a tool change station indicated generally by the reference numeral 75A, while the spindle 35 is located in an operating station generally indicated by the reference numeral 74A.

As previously described, power input to the spindle drive transmission 475, shown in FIG. 4, is effected by means of the speed change transmission 493. This same arrangement is utilized with the horizontal spindle type machine of FIG. 24, and to this end, the speed change transmission 493 is removed from the column 22 by simply removing the plurality of screws 498 which secure the transmission in operative position in the column. With the screws 498 removed, the speed change transmission 493 may be withdraw nfrom the interior of the column 22. As depicted in FIG. 2, the left side of the pedestal 21 is provided with an access cover 742 in which an opening 743 is formed, the opening being sealed by a removable cover 744 when the pedestal 21 is utilized in the vertical spindle type machine arrangement. In the horizontal spindle type of machine, the cover 744 is removed and the speed change transmission 493 is inserted into the opening 473, being secured in position by screws, as indicated in FIG. 24. In order to interconnect the input shaft 478 of the spindle drive transmission 475 with the output shaft 496 of the speed change transmission, the input gear 486, shown in FIG. 4, of the spindle drive transmission is removed from the shaft and a bevel gear 746 substituted therefor, as shown in FIG. 24. Likewise, the output gear 497, FIG. 4, of the speed change transmission is replaced by a bevel gear 747. With the speed change transmission 493 disposed within the pedestal 21, the bevel gear 747 is adapted to mesh with the bevel input gear 746 provided on the depending end of the input shaft 478 of the spindle drive transmission.

The spindle drive motor 488, shown in FIG. 4, which is secured to the rear face of the column 22 and operatively connected to drive the speed change transmission, may be removed from the column and used for the same purpose in conjunction with the horizontal spindle type machine. To this end, a cover plate 748, shown in FIG. 2, at the lower right corner of the pedestal is removed and the drive shaft 489 of the motor 488 inserted into the opening uncovered by the removal of the plate 748. However, when the motor 488 is mounted on the pedestal for driving the speed change transmission, as arranged in the horizontal spindle type machine, the motor drive shaft 489 will be at a right angle relative to the rightward extending end of the power input shaft 491 of the speed change transmission 493. Therefore, a bevel gear 749 is secured to the motor drive shaft 489 in place of the previously used spur gear 490. With the spindle drive motor 488 mounted on the side of the pedestal, the bevel gear 749 is adapted to mesh with a bevel gear 751 that is secured to the rightward extending end of the speed change transmission input shaft 491.

In the vertical spindle type machine illustrated in FIGS. 1, 2 and 3, the indexing movement of the spindle head 26 is effected by means of the motor 380. This motor 380, along with the associated shaft 382, bevel gear 384, and supporting sleeve 383, as shown in FIG. 13, may be removed as a unit from the column 22 and employed for the same purpose in conjunction with the horizontal spindle type machine arrangement. To this end, a cover plate 752, shown in FIG. 2, which serves to seal a suitable opening formed in the pedestal access cover plate 742, is removed and the supporting sleeve 383 and shaft 382, with the bevel gear 384 secured thereon, is inserted in the opening so that the bevel gear 384 meshes with the bevel gear 385 that is scured to the spindle head bull gear shaft 386, shown in FIG. 13. The spindle head bull gear drive shaft 386 along with its associated gears 385 and 389, bearing sleeve 387 and bearings 388, are removable as a unit with the mounting plate 221. Therefore, with the mounting plate 221 disposed within the opening 741 of the pedestal 21, the spindle head bull gear drive shaft 386 will be disposed with its axis in a vertical plane and its associated bevel gear 385 will be positioned to mesh with the bevel gear 384 on the drive shaft 382 of the motor 380, when the motor 380 is relocated on the pedestal 21.

To accommodate the entire tool change mechanism 24, the rear surface of the pedestal 21 is formed with a vertical recess 756, as indicated in FIG. 24. This recess 756 is sealed by a cover plate 757, which is attached to the rear wall of the pedestal when the pedestal is used in the machine arrangement illustrated in FIG. 2. When the tool change mechanism 24 is to be utilized in the horizontal spindle type machine, as illustrated in FIG. 24, the cover plate 757 is removed from the rear wall of the pedestal 21 to uncover the opening 756. The tool change mechanism 24, as a unit, which includes the base 85, its associated slide 90, the magazine 25, as well as the slide actuator 93, the motor 162 and worm gear housing 163, is removed from the top surface of the column 22 and inserted in the vertical recess 756, as shown in FIG. 24. With the arrangement shown in FIG. 24, the slide 90 is supported for movement along an axis which is disposed in a vertical plane. The magazine 25 will be movable bodily about an axis which is now disposed in a horizontal plane, with its bodily movement in a leftward direction, as viewed in FIG. 24, serving to withdraw a tool from the spindle located in the tool change station 75A, while its bodily movement from the leftward extended position, in a rightward direction, will serve to insert a new tool into the spindle. The rotation of the magazine 25 in an indexing movement will be about an axis located in the horizontal plane.

It is apparent that the operation of the spindle head 26, and the tool change mechanism 24, when arranged on the pedestal 21 for operation as a horizontal spindle type machine, as illustrated in FIG. 24, will be exactly the same and will serve the same purpose as they did in the vertical spindle type machine arrangement depicted in FIGS. 1, 2 and 3.

From the foregoing detailed description of the illustrative embodiment set forth herein to exemplify the present invention, it will be apparent that there has been provided an improved machine tool having a double spindle and incorporating a mechanical tool changer which carries a supply of tools in a minimum of space and also functions to replace a tool in one of the spindles with a new tool which is carried by the storage member while the other spindle is performing a work operation. It is also apparent, that the various operating components of the machine are arranged so that each component is removable from the machine as a unit without disturbing other machine components, and this arrangement facilitates the servicing of the machine. Furthermore, with the present invention, an efficient self-contained convertible machine tool organization of simple and relatively inexpensive construction is provided.

Although the illustrative embodiment of the invention has been described in considerable detail for the purpose of disclosing a practical operative structure whereby the invention may be practiced advantageously, it is to be understood that the apparatus described is intended to be illustrative only and that the novel characteristics of the invention may be incorporated in other structural forms without departing from the spirit and scope of the invention, as defined in the subjoined claims.

The principles of this invention having now been fully explained in connection with the foregoing description, I hereby claim as my invention:

1. In a machine tool;
   a frame;
   a spindle rotatably supported by said frame and adapted to receive a cutting tool for performing a work operation;
   a tool storage magazine supported by said frame and adapted to removably carry a plurality of cutting tools;
   a plurality of grips in said magazine with each of said grips being adapted to grip one tool for movement with said magazine;
   means for rotating said magazine to move said grips for selecting a desired tool for use in a work operation; and,
   means for moving said magazine in a translatory movement to move one of said grips into gripping engagement with a tool that is in the spindle and withdraw the tool from the spindle and to move a grip with a newly selected tool into alignment with the spindle, insert the selected tool into the spindle for use in a work operation and move said magazine away from said spindle to disengage the grip from the tool that was inserted into said spindle.

2. A machine tool according to claim 1 wherein said magazine moves laterally for moving a tool toward and away from the spindle, and said magaizne is moved axially for withdrawing the previously used tool from the spindle and for inserting a new tool into the spindle.

3. A machine tool according to claim 1 wherein said spindle is movable laterally between a tool change station and a work station, said spindle being moved to the tool change station for cooperation with said magazine to effect a tool change operation and said spindle is moved to the work station for the performance of a work operation with the tool received from said magazine.

4. A machine tool according to claim 3 including a second spindle rotatably carried by the frame and being adapted to receive and secure a cutting tool for performing a work operation; and,
   means for bodily moving both of said spindles between the tool change station and the work station.

5. A machine tool according to claim 4 wherein both of said spindles are mounted on a single spindle head and said spindle head is indexable for moving one of said spindles from the work station to the tool change station while the other spindle is being moved from the tool change station to the work station.

6. A machine tool according to claim 5 wherein said frame comprises a base and a column upstanding from said base and said tool storage magazine is mounted on top of said column and said spindle head is mounted on the face of said column.

7. In a machine tool;
   a frame;
   a rotatable spindle adapted to receive a cutting tool for performing a work operation;
   a tool storage magazine adapted to removably carry a plurality of cutting tools for use in said spindle;
   first spindle mounting means for mounting said spindle on said frame in a first position;
   second spindle mounting means for mounting said spindle in said frame in a second position;
   first magazine mounting means for mounting said tool storage magazine on said frame in a position to accommodate the mounting of said spindle in its first position;
   second magazine mounting means for mounting said tool storage magazine on said frame in a position to accommodate the mounting of said spindle in its second position; and,
   means for transferring tools between said spindle and said storage magazine for either position of said spindle.

8. A machine tool according to claim 7 where the axis of said spindle is in a vertical orientation when said spindle is in its first position, and the axis of said spindle is in a horizontal orientation when said spindle is in its second position.

References Cited by the Examiner

UNITED STATES PATENTS

| 1,144,744 | 6/1915 | Wheeler | 29—27 |
| 1,510,167 | 9/1924 | Wilhelm | 29—27 |
| 2,685,122 | 8/1954 | Berthiez | 29—26 |
| 2,821,009 | 1/1958 | Maier | 29—27.1 |
| 2,901,927 | 9/1959 | Morgan | 29—26 |
| 3,074,147 | 1/1963 | Miller | 29—26 |
| 3,133,349 | 5/1964 | Riedel | 29—568 |
| 3,150,878 | 9/1964 | Budden | 279—9 |
| 3,171,663 | 3/1965 | Stark | 279—4 |
| 3,174,222 | 3/1965 | Pohl | 29—568 |
| 3,225,439 | 12/1965 | Hughes | 29—568 |

RICHARD H. EANES, Jr., *Primary Examiner.*